United States Patent
Nakano et al.

(10) Patent No.: US 7,237,076 B2
(45) Date of Patent: Jun. 26, 2007

(54) METHOD OF MAINTAINING A PLURALITY OF SNAPSHOTS, SERVER APPARATUS AND STORAGE APPARATUS

(75) Inventors: Takahiro Nakano, Yokohama (JP); Koji Sonoda, Sagamihara (JP); Yoshiaki Eguchi, Machida (JP); Takashi Horiuchi, Yokohama (JP); Katsumi Hirezaki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 283 days.

(21) Appl. No.: 10/651,633

(22) Filed: Aug. 29, 2003

(65) Prior Publication Data

US 2004/0186900 A1    Sep. 23, 2004

(30) Foreign Application Priority Data

Mar. 18, 2003  (JP)  ............................. 2003-073101
Jun. 13, 2003  (JP)  ............................. 2003-168589

(51) Int. Cl.
*G06F 12/00*  (2006.01)
(52) U.S. Cl. .................. 711/162; 711/112; 711/202; 707/204; 707/203
(58) Field of Classification Search ................ 711/112, 711/114, 161, 162, 165, 202, 203; 707/204, 707/203, 205
See application file for complete search history.

(56) References Cited

U.S. PATENT DOCUMENTS

| | | | |
|---|---|---|---|
| 5,649,152 A | 7/1997 | Ohran | |
| 5,720,026 A | 2/1998 | Uemura | |
| 5,819,292 A | 10/1998 | Hitz | |
| 5,963,962 A | 10/1999 | Hitz et al. | |
| 6,185,665 B1 | 2/2001 | Owada et al. | |
| 6,205,450 B1 | 3/2001 | Kanome | |
| 6,341,341 B1 | 1/2002 | Grummon et al. | |

(Continued)

FOREIGN PATENT DOCUMENTS

JP  A-09-101912  4/1997

(Continued)

OTHER PUBLICATIONS

Jensen et al., "Temporal Data Management," IEEE Transactions of Knowledge and Data Engineering, vol. 11, No. 1, Jan./Feb. 1999, (pp. 36-44).*

(Continued)

*Primary Examiner*—Pierre-Michel Bataille
(74) *Attorney, Agent, or Firm*—Townsend and Townsend and Crew LLP

(57) ABSTRACT

Snapshots are implemented by combining original data in a place where an operational volume has been updated with data in a place where the operational volume has not been updated. A snapshot management table maintains a value indicating that update has not been conducted, or a storage place of original data, for each of combinations of blocks in the operational volume and the snapshots. If there is a snapshot in which update has not been conducted in a update place at the time of update, then original data is copied and the snapshot management table is updated. The copied original data is managed by a difference block management table, which has a value indicating whether respective snapshots are referencing the data. If a snapshot is deleted, then the value indicating that the snapshot is referencing is altered in all entries in the difference block management table.

19 Claims, 23 Drawing Sheets

U.S. PATENT DOCUMENTS

| | | | |
|---|---|---|---|
| 6,473,775 B1 | 10/2002 | Kusters et al. | |
| 6,557,024 B1 | 4/2003 | Saito et al. | |
| 6,594,744 B1 | 7/2003 | Humlicek et al. | |
| 6,665,815 B1 | 12/2003 | Goldstein et al. | |
| 6,704,755 B2* | 3/2004 | Midgley et al. | 707/204 |
| 6,799,258 B1* | 9/2004 | Linde | 711/162 |
| 7,100,089 B1 | 8/2006 | Phelps | 711/162 |
| 7,158,991 B2* | 1/2007 | Kekre et al. | 707/102 |
| 2003/0167380 A1* | 9/2003 | Green et al. | 711/160 |
| 2003/0182313 A1* | 9/2003 | Federwisch et al. | 707/200 |
| 2003/0191840 A1 | 10/2003 | Maciel | |
| 2003/0229651 A1 | 12/2003 | Mizuno et al. | |
| 2004/0133602 A1* | 7/2004 | Kusters et al. | 707/104.1 |
| 2004/0267836 A1* | 12/2004 | Armangau et al. | 707/203 |
| 2005/0015663 A1 | 1/2005 | Armangau et al. | |

FOREIGN PATENT DOCUMENTS

| | | |
|---|---|---|
| JP | A-2002-278819 | 9/2002 |

OTHER PUBLICATIONS

Toigo Partners International LLC: "Introducing Time Addressable Storage: a common-sense approach to data protection," Business Technology Brief, May 28, 2003, (14 pages).*

"The Enterprise Challenge Served by Snapshot", Whitepaper, LSI Logic Storage Systems, pp. 1-8.*

* cited by examiner

FIG.3

| BLOCK ADDRESS | CoW BIT MAP | VIRTUAL VOLUME 1 | VIRTUAL VOLUME 2 | ... | VIRTUAL VOLUME n |
|---|---|---|---|---|---|
| 0 | 00...0 | 0 | 0 | ... | 0 |
| 1 | 00...0 | 1 | 2 | ... | 3 |
| 2 | 10...0 | NONE | 4 | ... | 4 |
| ---- | ---- | ---- | ---- | ... | ---- |
| m-1 | 11...1 | NONE | NONE | ... | NONE |

FIG.4

| BLOCK ADDRESS | POSSESSION BIT MAP | |
|---|---|---|
| 0 | 11···1 | ~401 |
| 1 | 10···0 | ~402 |
| 2 | 01···0 | ~403 |
| 3 | 00···1 | ~404 |
| 4 | 01···1 | ~405 |
| ⋮ | ⋮ | |
| p-1 | 00···0 | ~406 |

| BLOCK ADDRESS 311 | CoW BIT MAP 312 | VIRTUAL VOLUME 1 313 | VIRTUAL VOLUME 2 314 | ... | VIRTUAL VOLUME n 315 |
|---|---|---|---|---|---|
| 0 | NONE | 100 | 200 | ... | 300 |
| ---- | ---- | ---- | ---- | ... | ---- |
| q-1 | NONE | 189 | 299 | ... | 399 |
| q | 10···0 | NONE | 4 | ... | 4 |
| ---- | ---- | ---- | ---- | ... | ---- |
| m-1 | 11···1 | NONE | NONE | ... | NONE |

1721, 1801, 1802, 1803, 1804

METHOD OF MAINTAINING A PLURALITY OF SNAPSHOTS, SERVER APPARATUS AND STORAGE APPARATUS

BACKGROUND OF THE INVENTION

The present invention relates to snapshots of a volume image in a computer system using a storage, and in particular, to a method of, and apparatus for, maintaining a plurality of snapshots taken at different point-in-times.

The snapshot function is a function of creating a point-in-time data image on a storage under operation when a snapshot is taken and making the point-in-time data image accessible by using means different from the storage under operation.

The use of the snapshot function makes it possible to readily access past image data by accessing to a point-in-time data image (hereinafter sometimes simply referred to as "snapshot"). Further, the use of the snapshot function also makes it possible to make a data backup by using snapshot data. Therefore, stop of updating of the volume, which is necessary for securing or freezing a to-be-backed-up file to make a data backup without snapshot function, becomes unnecessary, and an apparent backup window can be decreased.

Heretofore, the following methods have been used.

(1) There is a method of using a preservation storage area for preserving data obtained at the time of snapshot in order to maintain the snapshot. See, for example, U.S. Pat. No. 5,649,152.

If a snapshot of an operational volume is taken, then old data of a block that occurs thereafter and that is not yet updated is copied to the preservation storage area and a virtual volume for providing the snapshot is taken, at the time of update of the block.

As for reading from the virtual volume, if a block associated with an address to be read out has been already copied to the preservation storage area, the block is returned.

If the copy is not present in the preservation storage area, then an alteration has not occurred in the operational volume, and consequently a block associated with the same address in the operational volume is returned.

As for the volume image in the virtual volume, therefore, the volume image in the operational volume at the time of snapshot taking is maintained.

(2) In a file system in which update data and control data stored on the memory at fixed intervals are written to a disk additionally and states that are significant as the file system and called consistency points are left on the disk, there is a method for implementing the snapshot. See, for example, U.S. Pat. No. 5,819,292.

According to the method, a file system image at the time of snapshot taking is maintained by creating consistency points at the time of snapshot taking and securing the consistency points as the snapshot.

(3) For maintaining a plurality of snapshots, there is a method of individually preparing preservation storage areas. See, for example, U.S. Pat. No. 5,649,152.

(4) There is a method of implementing a snapshot of a dedicated file system. See, for example, U.S. Pat. No. 5,819,292. This method cannot be applied to the case where a file system using another implementation method is used, or applications such as a database that occupies and uses a volume.

SUMMARY OF THE INVENTION

Operation forms of a storage using a snapshot are diversified.

For example, there is an operation form in which a snapshot is taken every day and the snapshots are maintained for one month. There is an operation form in which a snapshot is taken once an hour, and snapshots picked hour after hour are maintained within 24 hours, whereas snapshots picked day after day are maintained within one week.

For making possible such an operation, it is necessary that the storage capacity required for maintaining the snapshots can be kept to a required minimum and an operation cost of the snapshots can be reduced, besides that a plurality of snapshots can be maintained.

An object of the present invention is to make it possible to take a plurality of snapshots at an arbitrary point of time and maintain snapshots that can be deleted at an arbitrary point of time by adding few storages without affecting the block arrangement of the original volumes or the file system.

In accordance with an aspect of the present invention, the object is achieved by a server apparatus including at least one CPU, a memory, at least one network interface, and at least one storage interface, at least one disk apparatus being connected to the storage interface. In the server apparatus, snapshot difference data is read from/written to a block in a difference volume associated with the same address value as that of a block in a virtual volume, as reading from/writing to an operational volume for conducting ordinary reading/writing and reading/writing a snapshot from/to each of blocks in a plurality of virtual volumes. In the server apparatus, a first table is generated so as to store, in association with each of blocks in the operational volume, an address value of a block storing a snapshot in each of the virtual volumes or information indicating that any snapshot is not stored, and a value indicating whether snapshots are stored respectively in the virtual volumes. It is thus made possible for at least one client to read/write snapshots.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram showing a configuration example of a snapshot management table;

FIG. 4 is a diagram showing a configuration example of a difference block management table;

FIG. 18 is a diagram showing an example of a snapshot management program with preceding copy;

DESCRIPTION OF THE EMBODIMENTS

Hereafter, a first embodiment of the present invention will be described in detail with reference to FIGS. 1 to 8.

First, outlines of components concerning the present invention will be described, and then details of the processing procedure and the data structure will be described.

Figure 1:
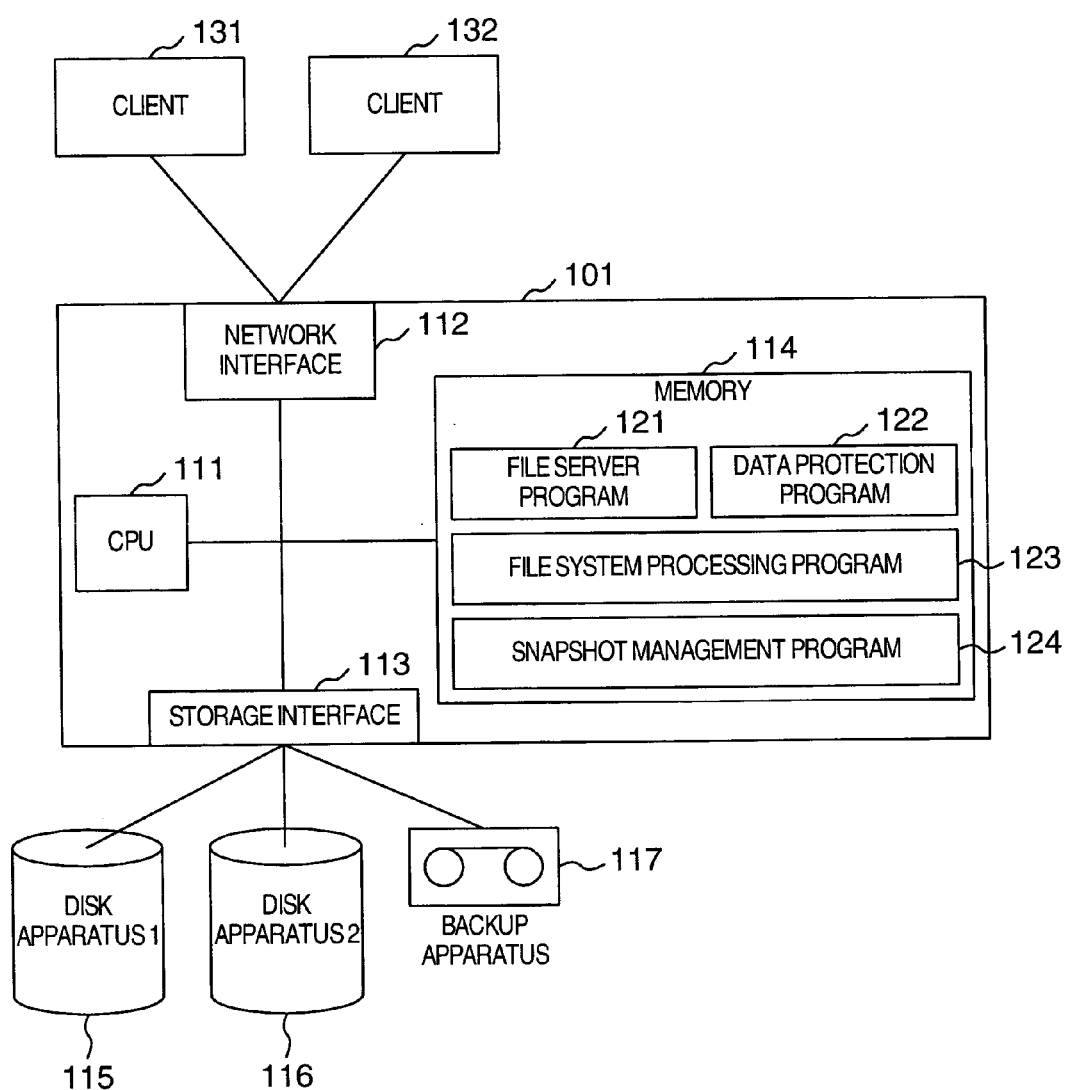
FIG. 1 is a diagram showing an example of a hardware configuration of a system according to the present invention.

FIG. 1 shows a configuration example of the first embodiment according to the present invention.

A server apparatus 101 provides clients 131 and 132 connected thereto via a network interface 112 with file share service.

The server apparatus 101 includes at least one CPU 111, at least one network interface 112, at least one storage interface 113, and a memory 114.

The memory 114 includes a file server program 121, a data protection program 122, a file system processing program 123, and a snapshot management program 124.

Disk apparatuses 115 and 116 and a backup apparatus 117 are connected to the storage interface.

The disk apparatuses 115 and 116 may use independent physical disk drives, respectively. Or it is also possible to divide a single physical disk drive into partitions, and use the partitions as the disk apparatuses 115 and 116, respectively.

In addition, it is also possible to make a large number of physical disk drives virtual as in a RAID apparatus, utilize the function of providing a plurality of logical disk apparatuses, and use the logical disk apparatuses as the disk apparatuses 115 and 116.

In the present embodiment, the backup apparatus 117 is connected to the storage interface in the server apparatus 101. However, the backup apparatus 117 may be connected to the storage interface in the client 131 via the network interface 112.

In response to a file access request issued by the client 131 or 132, the file server program 121 executes file or directory reading and writing processing on the file system processing program 123, and returns its result to the client 131 or 132, which is the request source.

In response to a file or directory reading and writing processing request issued by the file server program 121 or the data protection program 122, the file system processing program 123 issues data reading and writing processing to the snapshot management program 124 by specifying a volume, which stores a file or directory, and a block position and a size to be accessed.

The data protection program 122 requests the snapshot management program 124 to take or delete a snapshot. In addition, the data protection program 122 conducts processing of issuing a reading request of a specified file to the file system processing program 123, writing data read out to the backup apparatus 117, and creating a backup.

The snapshot management program 124 conducts processing of managing a volume (operational volume), which stores a file system, and a volume (difference volume), which stores difference data of snapshots, i.e., difference data required to maintain the snapshots, and responding to a request from the file system processing program 123, processing of maintaining the snapshots, and processing of making it possible to use the snapshots.

Herein, the term "volume" means an area secured on the disk apparatuses 115 and 116.

In the present embodiment, an operational volume, which stores a file system, is assigned to the disk apparatus 115, whereas a difference volume, which stores difference data of the snapshots, i.e., difference data required to maintain the snapshots, is assigned to the disk apparatus 116.

If a snapshot is taken for the operational volume on the disk apparatus 115, then the snapshot management program 124 makes it possible to access virtual volumes for providing the snapshots taken of the operational volume.

By accessing the virtual volume, the file system processing program 123 can utilize information obtained at the instant when the snapshot has been generated. Therefore, it becomes possible for the file system processing program 123 to provide a snapshot image of the file system.

Figure 2:
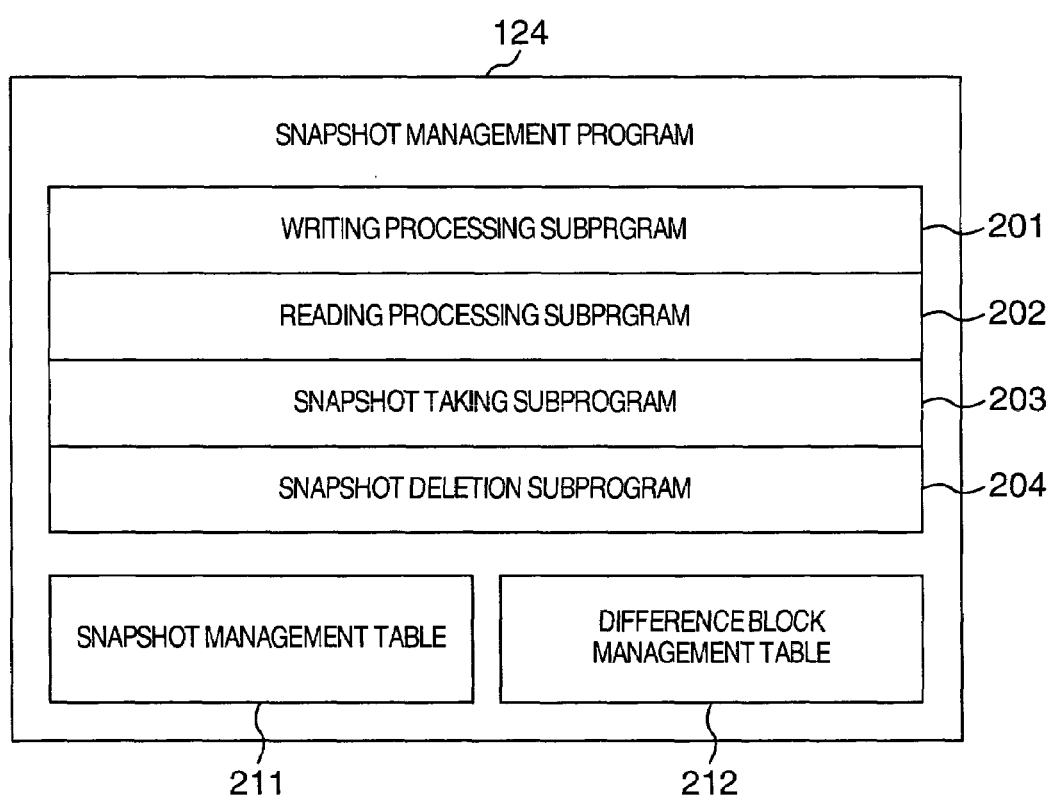
FIG. 2 is a diagram showing an example of a software and data configuration of a system according to the present invention.

FIG. 2 shows a configuration of the snapshot management program 124.

The snapshot management program 124 calls a writing processing subprogram 201 and a reading processing subprogram 202 in response to a processing request issued by the file system processing program 123, and calls a snapshot taking subprogram 203 and a snapshot deletion subprogram 204 in response to a processing request issued by the data protection program 122.

A snapshot management table 211 holds data in order to maintain snapshots and make the snapshots usable.

A difference block management table 212 holds data in order to manage the block use situation in the difference volume.

FIG. 3 shows details of the snapshot management table 211.

A column 311 in the snapshot management table 211 corresponds to block addresses in the operational volume. A first block address (hereafter referred to as block address 0) in the operational volume is assigned to a first row (hereafter referred to as the first row). A block address 1 in the operational volume is assigned to a second row. Hereafter, block addresses in the operational volume are assigned in order. A block address (m−1) in the operational volume is assigned to an mth row, which is the final row.

A column 312 is a copy-on-write bit map, which will be described later.

As a block address in a virtual volume 1, 0 is assigned to a first row in the virtual volume 1 corresponding to a snapshot number 1 (in this case, the snapshot number is the same as the number of the virtual volume). (Block addresses are numbered 0, 1, 2, . . . in order beginning with the first row.) As a block address in the virtual volume 1, 1 is assigned to a second row in the virtual volume 1. "None" is assigned to a third row and an mth row.

The block address 0 in the virtual volume 1 assigned to the first row in the virtual volume 1 corresponds to a block address 0 in the difference volume. When data at the block address 0 in the operational volume is to be updated, it is supposed that data at the block address 0 preceding the update has been virtually written to the virtual volume 1 at the block address 0, and an entity of data at the block address 0 in the operational volume preceding its update is written to the difference volume at the block address 0.

By accessing the block address 0 in the virtual volume 1 assigned to the first row, i.e., accessing the block address 0 in the difference volume, the data at the block address 0 in the operational volume preceding its update is obtained. By using the data thus obtained and data at block addresses 1 to (m−1) in the operational volume, it becomes possible to provide a snapshot image.

The block address 1 in the virtual volume 1 assigned to the second row in the virtual volume 1 corresponds to a block address 1 in the difference volume. When data at the block address 1 in the operational volume is to be updated, it is supposed that data at the block address 1 preceding the update has been virtually written to the virtual volume 1 at the block address 1, and an entity of data at the block address 1 in the operational volume preceding its update is written to the difference volume at the block address 1.

"None" is assigned to the block address 2 in the virtual volume 1, which is assigned to the third row in the virtual volume 1, and the block address (m−1) in the virtual volume 1, which is assigned to the mth row in the virtual volume 1. If "none", is assigned, then the block address 2 and the block address (m−1) in the operational volume are referenced, respectively. In other words, "none", indicates that update (rewriting) has not been conducted on the operational volume.

The block address 0 in a virtual volume 2 assigned to the first row in the virtual volume 2 corresponds to the block address 0 in the difference volume. When data at the block address 0 in the operational volume is to be updated, it is supposed that data at the block address 0 preceding the update has been virtually written to the virtual volume 2 at the block address 0, and an entity of data at the block address 0 in the operational volume preceding its update is written to the difference volume at the block address 0.

The block address 1 in the virtual volume 2 assigned to the second row in the virtual volume 2 corresponds to a block address 2 in the difference volume. When data at the block address 1 in the operational volume is updated, it is supposed that data at the block address 1 preceding the update has been virtually written to the virtual volume 2 at the block address 1, and an entity of data at the block address 1 in the operational volume preceding its update is written to the difference volume at the block address 2.

The block address 2 in the virtual volume 2 assigned to the third row in the virtual volume 2 corresponds to a block address 4 in the difference volume. When data at the block address 2 in the operational volume is updated, it is supposed that data at the block address 2 preceding the update has been virtually written to the virtual volume 2 at the block address 2, and an entity of data at the block address 2 in the operational volume preceding its update is written to the difference volume at the block address 4.

"None" is assigned to the block address (m−1) in the virtual volume 2, which is assigned to the mth row in the virtual volume 2. If "none", is assigned, then the block address (m−1) in the operational volume is referenced.

Description of a virtual volume n is similar to the description of the virtual volumes 1 and 2, and consequently it will be omitted.

A column 312 indicates a CoW (copy-on-write) bit map. The number of bits in the CoW bit map is equal to the number of virtual volumes. In this case, the number of virtual volumes is n. Therefore, the number of bits in the CoW bit map is also n. A first bit in the CoW bit map corresponds to the virtual volume 1. A second bit in the CoW bit map corresponds to the virtual volume 2. An nth bit in the CoW bit map corresponds to the virtual volume n. If there is registration of update in a block address of a kth row in a virtual volume, then a bit in the CoW bit map in the kth row corresponding to the virtual volume is set equal to 0. If there is no registration of update in the block address of the kth row in the virtual volume, i.e., "none", is assigned thereto, then a bit in the CoW bit map in the kth row corresponding to the virtual volume in the kth row is set equal to 1.

Since 0 is assigned to the block address in the first row of each virtual volume shown in FIG. 3, all bits in the CoW bit map in the first row become 0.

Since "none", is assigned to the block address in the mth row of each virtual volume shown in FIG. 3, all bits in the CoW bit map in the first row become 0.

Herein, it is assumed that the size of the operational volume is m blocks and the maximum number of snapshots is n.

For example, assuming the block size to be 512 bytes, the size of the operational volume to be 128 gigabytes, and the maximum number of snapshots to be 64, it follows that m=250,000,000 and n=64.

The block size, the size of the operational volume, and the number of snapshots may be arbitrarily set, because they do not affect the effects of present invention.

In a row 301 shown in FIG. 3, the column 311 indicates the block address 0 in the operational volume, and the column 312 shows that the CoW bit map is 00 . . . 0. In the row 301, the columns 313, 314 and 315 show that contents at the block address 0 in the virtual volumes 1, 2 and n corresponding to the snapshots 1, 2 and n (i.e., contents (difference data) at the block address 0 in the operational volume preceding the update) are stored in the difference volume at the block address 0.

In a row 302, the column 311 indicates the block address 1 in the operational volume, and the column 312 shows that the CoW bit map is 00 . . . 0. In the row 302, the column 313 shows that contents at the block address 1 in the virtual volume 1 corresponding to the snapshot 1 are stored in the difference volume at the block address 1. In the row 302, the column 314 shows that contents at the block address 1 in the virtual volume 2 corresponding to the snapshot 2 are stored in the difference volume at the block address 2. In the row 302, the column 315 shows that contents at the block address 1 in the virtual volume n corresponding to the snapshot n are stored in the difference volume at the block address 3.

In a row 303, the column 311 indicates the block address 2 in the operational volume, and the column 312 shows that the CoW bit map is 10 . . . 0. In the row 303, the column 313 shows that contents at the block address 2 in the virtual volume 1 corresponding to the snapshot 1 are stored in the operational volume at the block address 2. In the row 303, the column 314 shows that contents at the block address 2 in the virtual volume 2 corresponding to the snapshot 2 are stored in the difference volume at the block address 4. In the row 303, the column 315 shows that contents at the block address 2 in the virtual volume n corresponding to the snapshot n are stored in the difference volume at the block address 4.

The "none", assigned to the block address 2 in the virtual volume 1 in the column 313 shows that the data at the block address 2 in the operational volume has not been updated after the contents at the block address 2 in the virtual volume 2 in the column 314 was stored in the difference volume at the block address 4.

In a row 304, the column 311 indicates the block address (m−1) in the operational volume, and the column 312 shows that the CoW bit map is 11 . . . 1. In the row 304, the column 313 shows that contents at the block address (m−1) in the virtual volume 1 corresponding to the snapshot 1 are stored in the operational volume at the block address (m−1). In the row 303, the column 314 shows that contents at the block address (m−1) in the virtual volume 2 corresponding to the snapshot 2 are stored in the operational volume at the block address (m−1). In the row 303, the column 315 shows that contents at the block address (m−1) in the virtual volume n corresponding to the snapshot n are stored in the operational volume at the block address (m−1). In other words, it is shown that the operational volume has not been updated (rewritten).

The CoW bit map shown in each of entries in the column 312 is a storage area having at least n bits, which indicates the maximum number of snapshots. Each bit corresponds to a snapshot number, and indicates whether update has been conducted since the snapshot began to be maintained. In the case of FIG. 3, "0" indicates that there is update and "1" indicates that there is no update.

When writing block data to the operational volume, the writing processing subprogram 201 references the CoW bit map, and uses it to determine whether data at the write address preceding the update should be copied to the difference volume and determine in a virtual volume of which snapshot a block address should be rewritten.

FIG. 4 shows details of the difference block management table 212.

Mainly in order to manage the use situation of blocks in the difference volume 116, the difference block management table 212 shows correspondence between a block address column 411 and a possession bit map column 412 with respect to blocks on the difference volume 116.

A row 401 shows that a block at address 0 in the difference volume has a possession bit map 11 . . . 1.

The same is true of rows 402 to 406 as well.

The possession bit map shown in each of entries in the column 412 is a storage area having at least n bits, which indicates the maximum number of snapshots. Each bit corresponds to a snapshot number, and indicates whether there is reference as a block, which forms a virtual volume of a snapshot. In the case of FIG. 4, "1" indicates that there is reference and "0" indicates that there is no reference.

When copying block data in the operational volume to the difference volume in writing to the operational volume, the writing processing subprogram 201 updates a bit corresponding to a snapshot number that references the block with "1".

When deleting a snapshot, the snapshot deletion subprogram 204 updates corresponding bits in possession bit maps for all referenced blocks with "0".

When obtaining an empty block from the difference volume, a block having a possession bit map in which all bits are "0" is selected.

Hereafter, processing flows of respective subprograms in the snapshot management program 124 will be described.

Figure 5:
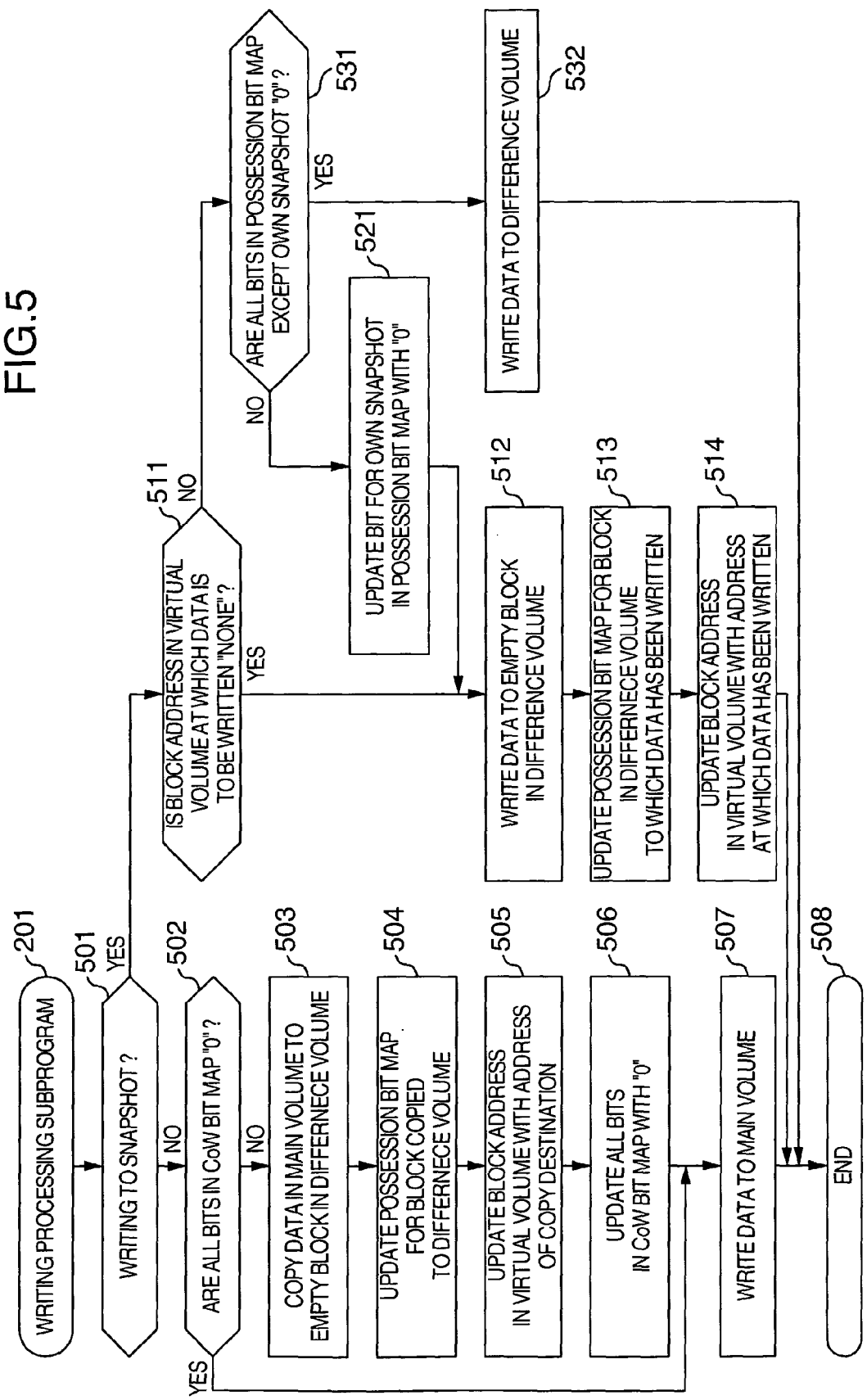
FIG. 5 is a diagram showing an example of a processing flow of a writing processing subprogram.

FIG. 5 shows a processing flow of the writing processing subprogram 201 in the snapshot management program 124.

At step 501, it is determined whether the processing is writing to the snapshot. In other words, it is determined whether the processing is writing to difference data obtained by taking a snapshot in the past. In the case of the operational volume, the processing proceeds to step 502. In the case of the snapshot, the processing proceeds to step 511. Processing of the step 502 and its subsequent steps is exceptional processing, which is not conducted typically. Processing of the step 502 and its subsequent steps is processing that is conducted typically.

At the step 502, a COW bit map in the CoW bit map column 312 corresponding to a block in the block number column 311 to which data is to be written, in the snapshot management table 211 is referenced, and it is determined whether all bits are "0". If all bits are "0" then the processing proceeds to step 507. If even one bit is "1" then the processing proceeds to step 503.

At the 503, data of a block to which data is to be written is copied to an empty block (i.e., a block having a possession bit map in which all bits are "0").

At step 504, the value of the CoW bit map referenced at the step 502 is stored in a possession bit map in the possession bit map column 412 in the difference block management table 212 that corresponds to a block address in the block address column 411 for the block in the difference volume copied at the step 503.

At step 505, the block address in the difference volume copied at the step 503 is stored in all of block address fields in which a bit in the CoW bit map referenced at the step 502 is "1" among the block address fields (313, 314 and 315) in the virtual volumes.

At step 506, values of all bits in the CoW bit map referenced at the step 502 are updated with At step 507, specified data is written to a block indicated by a specified block address in the operational volume.

Hereafter, an actual example of processing conducted at the steps 502 to 506 will be described.

When writing to the operational volume at the block address 2 in the block addresses 311 at the step 502, the CoW bit map is 10 . . . 0. Not all bits are "0" but there is a bit of "1". Therefore, the processing proceeds to the step 503. At the step 503, for example, a block address (p−1) in the difference volume is selected as an empty block (i.e., a block having a possession bit map in which all bits are "0") in the difference volume, and data at the block address 2 in the operational volume preceding the update is copied to the block (p−1).

At the step 504, the value "10 . . . 0" of the CoW bit map for the block address 2 in the operational volume is stored in the possession bit map for the block address (p−1) in the difference block management table.

At the step 505, the block address in the virtual volume 1 for the block address 2 in the operational volume is updated with the block address (p−1) in the difference volume.

At the step 506, the value "10 . . . 0" of the CoW bit map for the block address 2 in the operational volume is changed to "00 . . . 0."

At the step 511, the value of the block address (313, 314 or 315) in the virtual volume at which data is to be written, in the snapshot management table 211 is referenced, and it is determined whether the value indicates "none". If the value indicates "none", then the processing proceeds to step 512. If the value does not indicate "none", then the processing proceeds to step 531.

At the step 531, the value of the possession bit map 412 associated with an address 411 corresponding to the value of the block address referenced at the step 511 in the difference block management table 212 is referenced. If all of the values of bits indicating other virtual volumes except the virtual volume to which data is to be written are "0" then only difference data concerning the virtual volume to which data is to be written is present in the block in the difference volume indicated by the block address in the virtual volume at which data is to be written, and difference data concerning other virtual volumes are not present therein, and consequently the processing proceeds to step 532. If even one bit value is "1" then difference data concerning another virtual volume is also present, and consequently the processing proceeds to step 521.

At the step 532, specified data is written to a block in the difference volume indicated by the block address referenced at the step 511.

At the step 521, the value of the bit that indicates the virtual volume to which data is to be written, in the possession bit map 412 referenced at the step 531 is updated with "0". In other words, from a block in the difference volume in which difference data concerning the own virtual volume and difference data concerning other virtual volumes are present, the difference data concerning the own virtual volume is removed, and the processing proceeds to the step 512.

At the step 512, specified data is written to an empty block (i.e., a block having a possession bit map in which all bits are "0") in the difference volume. Since it is writing to past difference data, writing to the operational volume cannot be conducted, and consequently such processing is conducted.

At step 513, in the value of the possession bit map column 412 corresponding to the block address column 411 in the difference volume copied at the step 512 in the difference block management table 212, the bit indicating the virtual volume to which data is to be written is updated with "1".

At step 514, the value of the block address referenced at the step 511 is updated with the address of the block in the difference volume to which the data has been written at the step 512.

At step 508, the processing is finished.

Figure 6:
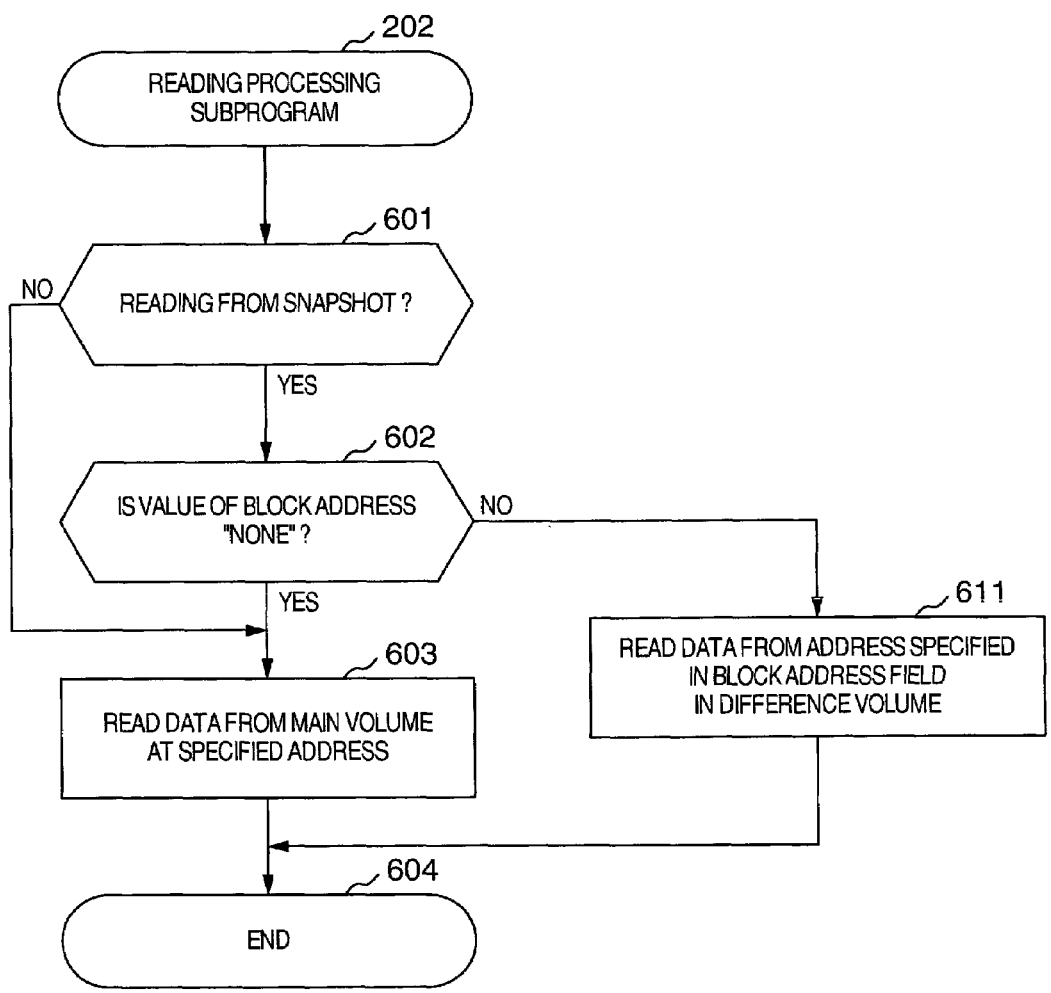
FIG. 6 is a diagram showing an example of a processing flow of a reading processing subprogram.

FIG. 6 shows a processing flow of the reading processing subprogram 202 in the snapshot management program 124.

At step 601, it is determined whether the reading is reading from the snapshot. In the case of the operational volume 115, the processing proceeds to step 603. In the case of the snapshot, the processing proceeds to step 602.

At the step 602, the value of the block address in the difference volume 116 corresponding to a specified block address in a virtual volume to be read described in the snapshot management table 211 is referenced, and it is determined whether the value is "none". If the value is "none", then the processing proceeds to the step 603. If the value is not "none", then the processing proceeds to step 611.

At the step 603, block data read out from a block that is indicated by a specified block address in the operational volume 115 is returned.

At the step 611, block data read out from the block that is indicated by the block address in the difference volume 116 referenced at the step 602 is returned. At step 604, the processing is finished.

Figure 7:
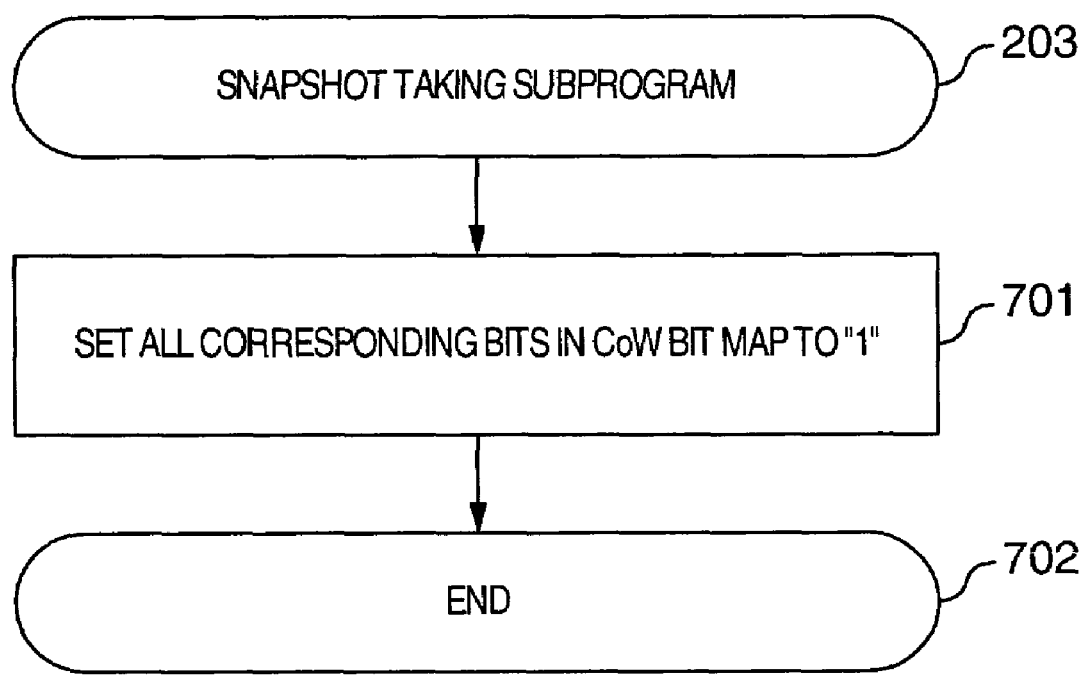
FIG. 7 is a diagram showing an example of a processing flow of a snapshot taking subprogram.

FIG. 7 shows a processing flow of the snapshot taking subprogram 203 in the snapshot management program 124.

At step 701, bits for a virtual volume corresponding to a snapshot to be taken, in the CoW bit map column 312 are updated with "1" for all block addresses in the block address column 311 in the snapshot management table 211. In addition, all block addresses in the virtual volume corresponding to the snapshot to be taken are set to "none".

At step 702, the processing is finished.

At the step 701, the values in the CoW bit map column 312 are updated for all block addresses in the block address column 311 in the snapshot management table 211. In the case where there is an unused block as in a file system, however, an alteration may be effected so as to update bits corresponding to snapshots to be generated, in all bit maps in the CoW bit map column 312 except the unused block with "1". The unused block is a block that is not assigned to data storage, such as a file or a directory. The unused block is a block prepared to store data when newly creating a file or a directory in the future or when expanding the size.

Even if a write request for an unused block is issued and data stored in the unused block is updated, a snapshot in the file system never references data in the unused block, and consequently update of the data does not affect the snapshot in the file system. If an unused portion is updated after taking of the snapshot and the CoW bit for an unused block is "0" at the time of taking of the snapshot, therefore, then data preceding the update is not copied to the difference volume, and the data update in the unused block is reflected to the snapshot, contents being changed from those obtained at the time of the snapshot taking. In the file system using the snapshot, however, contents of the file or directory in the file system are not affected. If the CoW bit for the unused block is set to "0" when taking the snapshot, therefore, it becomes possible to reduce the amount of occurrence of difference.

Figure 8:
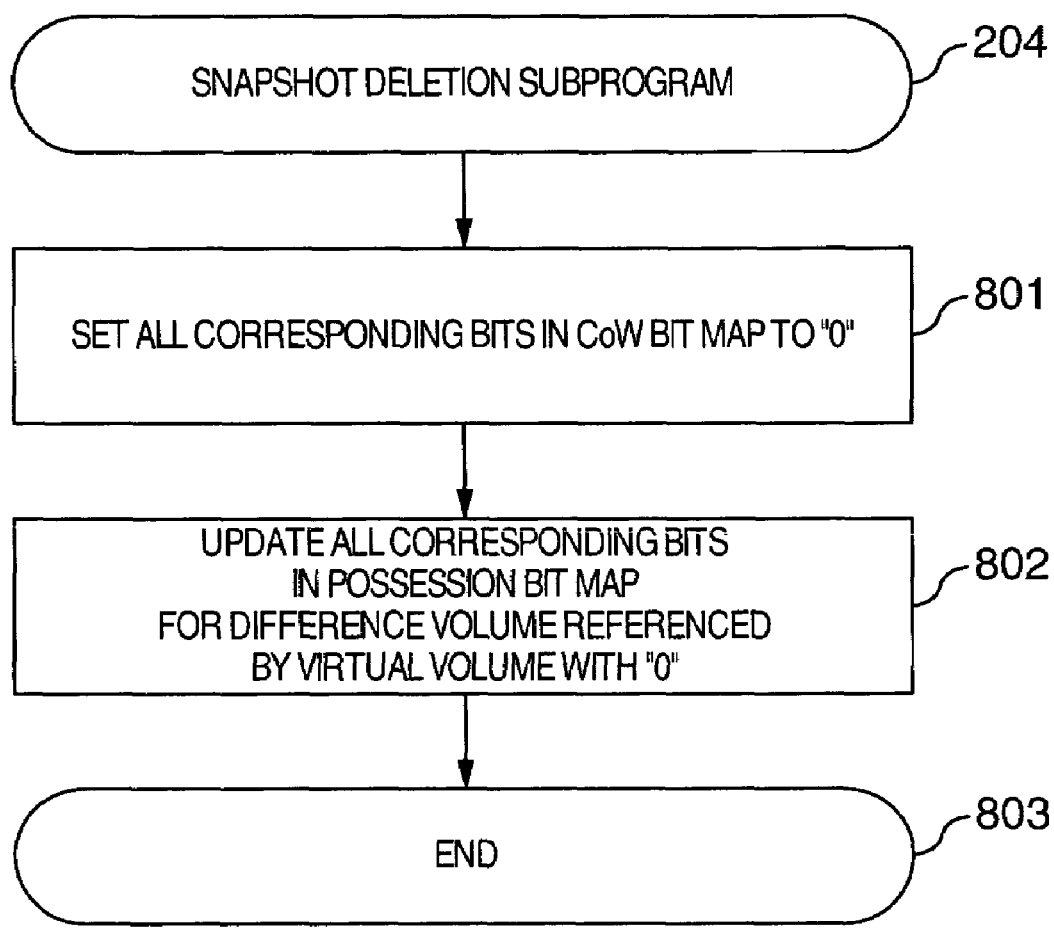
FIG. 8 is a diagram showing an example of a processing flow of a snapshot deletion subprogram.

FIG. 8 shows a processing flow of the snapshot deletion subprogram 204 in the snapshot management program 124.

At step 801, bits for a virtual volume corresponding to a snapshot to be deleted, in the CoW bit map column 312 are updated with "0" for all block addresses in the block address column 311 in the snapshot management table 211.

For all blocks in the difference volume 116 described in block addresses (for example, the column 314) in the virtual volume corresponding to the snapshot to be deleted in the snapshot management table, bits for the virtual volume corresponding to the snapshot to be deleted, in the possession bit map column 412 in the difference block management table 212 are updated with "0" at step 802.

At step 803, the processing is finished.

If in the first embodiment of the present invention, for example, the data protection program 122 orders the snapshot management program 124 to take a snapshot 1 of the operational volume 115, then the snapshot taking subprogram 203 is called, and the corresponding bit in the CoW bit map 312 in the snapshot management table 211 is set to "1" all block addresses in the virtual volume 1 (313) are set to "none".

Even if writing to the operational volume 115 is executed thereafter by the client 131, data of a block to which data is to be written is copied to the difference volume 116 by the writing processing subprogram 201 in the snapshot management program 124 and the block address in the virtual volume 1 (313) is updated. Thus, it is possible to maintain the same data as that obtained when the snapshot was taken.

It becomes possible for the data protection program 122 to obtain at any time data obtained at the time of snapshot taking by reading a file on the virtual volume 1 (313). It becomes possible to prevent file data being altered during data backup to the backup apparatus 117.

In the first embodiment of the present invention, the snapshot management table 211 and the difference block management table 212 are secured on the memory 114. By adding a procedure of copying data to the difference volume 116 whenever the snapshot management table 211 and the difference block management table 212 are updated, it becomes possible to maintain the snapshot easily even if a memory destruction (such as a power supply down or a system fault) occurs in the server apparatus 101.

While a file system is created in the operational volume 115 in the first embodiment of the present invention, similar effects can be obtained even in application to, for example, a volume occupied and used by a database.

Figure 9:
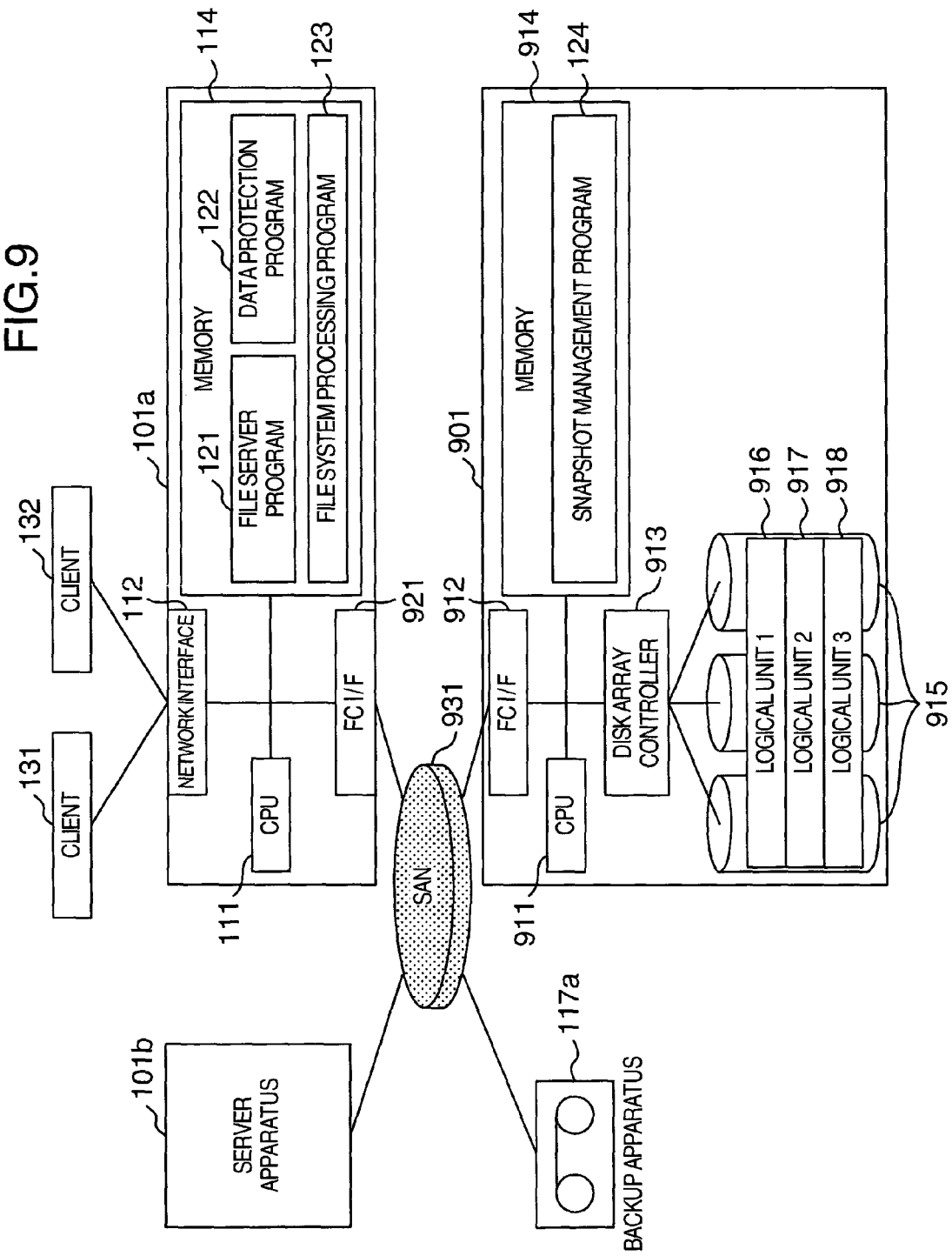
FIG. 9 is a diagram showing another example of a hardware configuration of a system according to the present invention.

FIG. 9 shows a configuration example of a second embodiment according to the present invention.

A server apparatus 101a provides clients 131 and 132 connected via a network interface 112 with file sharing service.

The server apparatus 101a includes at least one CPU 111, at least one network interface 112, at least one FC (Fiber Channel) interface 921, and a memory 114.

The memory 114 includes a file server program 121, a data protection program 122, and a file system processing program 123.

The FC interface is connected to a SAN (Storage Area Network) 931 including an FC switch, and operation on a storage apparatus 901 is made possible.

The storage apparatus 901 includes at least one CPU 911, at least one FC interface 912, at least one disk array controller 913, a memory 914, and at least one disk apparatuses 915.

The memory 914 includes a snapshot management program 124.

The disk array controller 913 uses at least one disk apparatus 915, and provides a plurality of logical units 916, 917 and 918, which are logical disk apparatuses.

The snapshot management program 124 can provide a virtual volume using a snapshot in the same way as the first embodiment of the present invention by, for example, assigning the operational volume to the logical unit 916 and assigning the difference volume to the logical unit 917.

By making the virtual volume usable as a virtual logical unit, it becomes possible to use a snapshot for apparatuses on the SAN 931.

By using the virtual logical unit, the server apparatus 101a can execute the data protection program 122 in the same way as the first embodiment of the present invention.

In addition, another server apparatus 101b for backup having a configuration similar to that of the server apparatus 101a can also use the virtual logical unit provided by the storage apparatus 901, via the SAN 931.

As a result, the server apparatus 101b for backup can preserve the contents of the virtual logical unit provided by the storage apparatus 901, i.e., the snapshot image into a backup apparatus 117a connected to the SAN 931.

Hereafter, a third embodiment of the present invention will be described in detail with reference to FIGS. 10 to 15.

Figure 10:
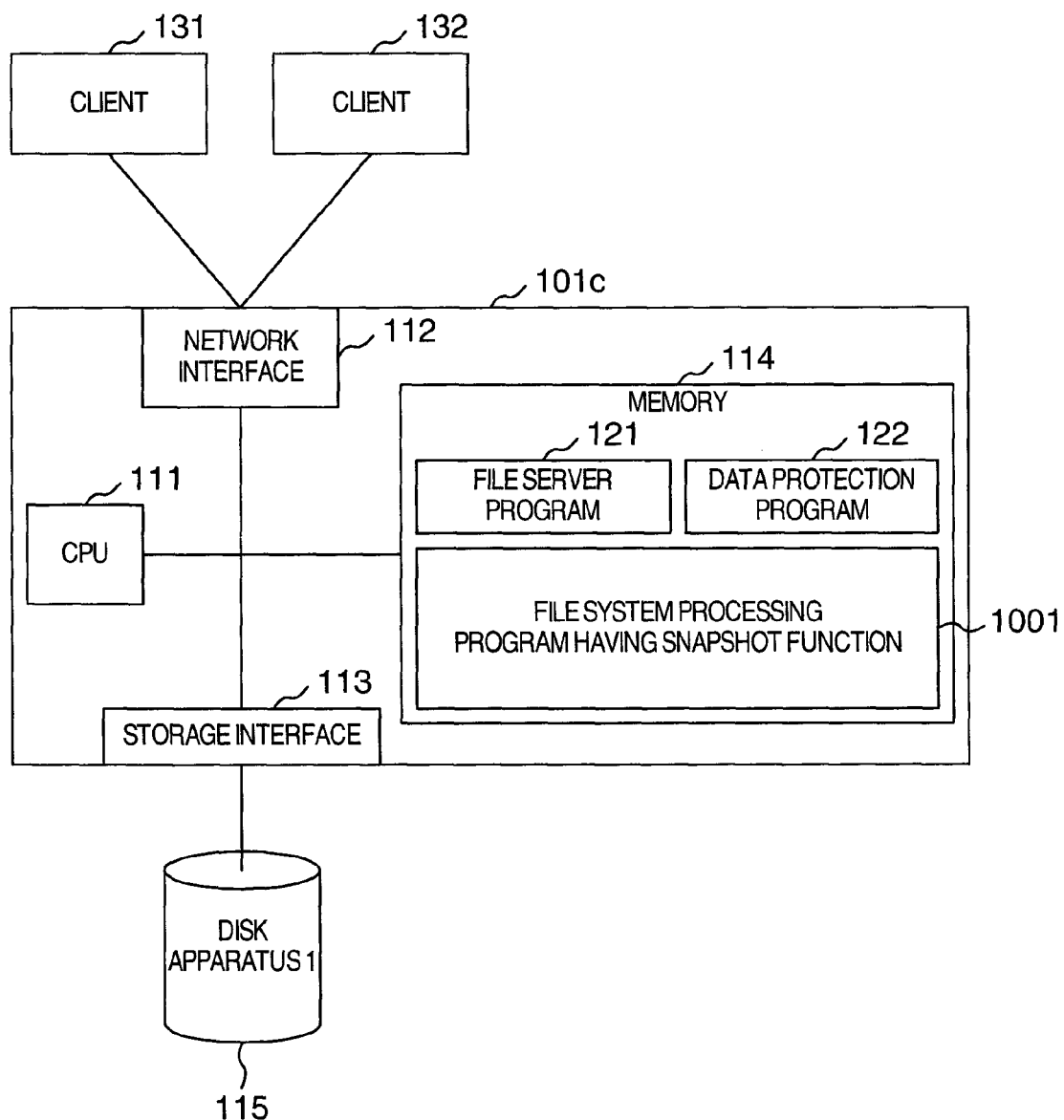
FIG. 10 is a diagram showing another example of a hardware configuration of a system according to the present invention.

FIG. 10 shows a configuration example of the third embodiment according to the present invention.

A server apparatus 101c provides clients 131 and 132 connected thereto via a network interface 112 with file share service.

The server apparatus 101c includes at least one CPU 111, at least one network interface 112, at least one storage interface 113, and a memory 114.

The memory 114 includes a file server program 121, a data protection program 122, and a file system processing program having snapshot function 1001.

A disk apparatus 115 is connected to the storage interface.

Figure 11:
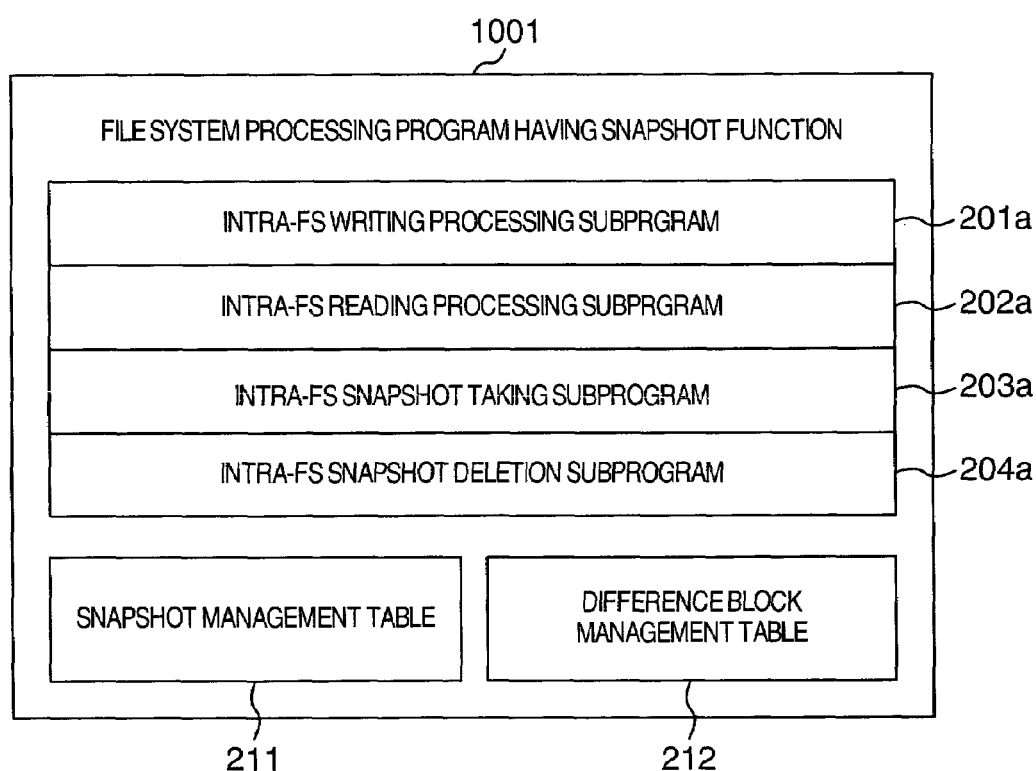
FIG. 11 is a diagram showing another example of a software and data configuration of a system according to the present invention.

FIG. 11 shows the arrangement of the file system processing program 1001 having snapshot function.

The file system processing program having snapshot function 1001 includes an intra-FS (File System) writing processing subprogram 201a, an intra-FS reading processing subprogram 202a, an intra-FS snapshot taking subprogram 203a, an intra-FS snapshot deletion subprogram 204a, a snapshot management table 211, and a difference block management table 212.

Figure 12:
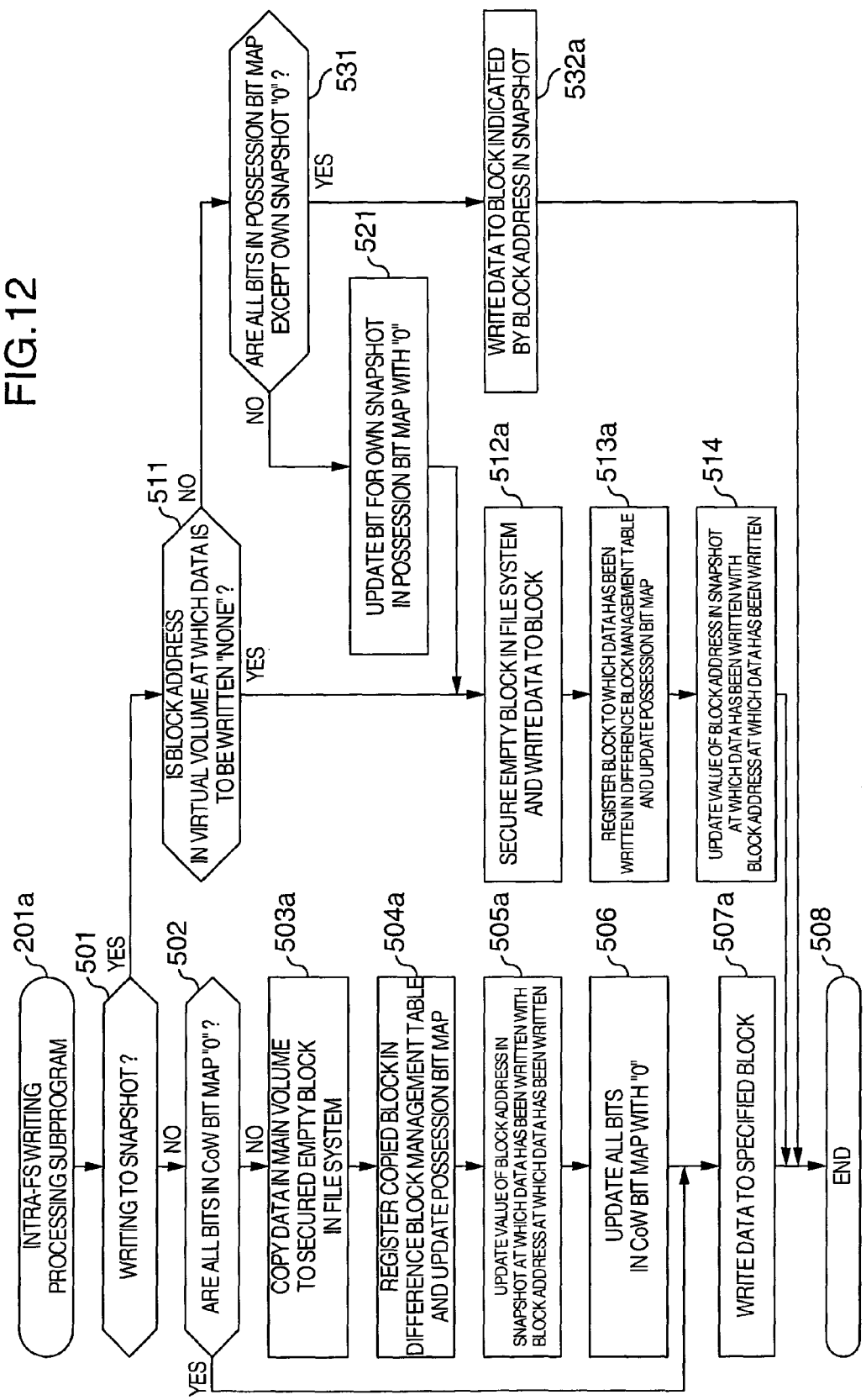
FIG. 12 is a diagram showing an example of a processing flow of an intra-file system writing processing subprogram.

FIG. 12 shows a processing flow of the intra-FS writing processing subprogram 201a in the file system processing program having snapshot function 1001.

At step 501, it is determined whether the processing is writing to the snapshot. In the case of the file system itself, the processing proceeds to step 502. In the case of the snapshot, the processing proceeds to step 511.

At the step 502, a CoW bit map in the CoW bit map column 312 corresponding to a block number in the block number column 311 to which data is to be written, in the snapshot management table 211 is referenced, and it is determined whether all bits are "0". If all bits are "0" then the processing proceeds to step 507a. If even one bit is "1" then the processing proceeds to step 503a.

At the step 503a, an empty block in the file system is secured, and data of a block to which data is to be written is copied to the secured empty block.

At step 504a, an entry having the block copied at the step 503a in the column 411 and having the value of the CoW bit map referenced at the step 502 in the corresponding possession bit map column 412 is registered in the difference block management table 212.

At step 505a, a block address of a block to which data of the block to be written was copied at the step 503a is stored in all of block address fields in which a bit in the CoW bit map referenced at the step 502 is "1" among the block address fields (313, 314 and 315) in the virtual volumes.

At step 506, values of all bits in the CoW bit map referenced at the step 502 are updated with "0".

At step 507a, specified data is written to a block indicated by a specified block address.

At step 511, the value of the block address (313, 314 or 315) in the virtual volume at which data is to be written, in the snapshot management table 211 is referenced, and it is determined whether the value indicates "none". If the value indicates "none", then the processing proceeds to step 512a. If the value does not indicate "none", then the processing proceeds to step 531.

At the step 531, the value of the possession bit map 412 associated with an address 411 corresponding to the value of the block address referenced at the step 511 in the difference block management table 212 is referenced. If all of the values of bits indicating other virtual volumes except the virtual volume to which data is to be written are "0", then the processing proceeds to step 532a. If even one of the bit values is "1", then the processing proceeds to step 521.

At the step 532a, specified data is written to a block indicated by the block address referenced at the step 511.

At the step 521, the value of the bit that indicates the virtual volume at which data is to be written, in the possession bit map 412 referenced at the step 531 is updated with "0", and the processing proceeds to the step 512a.

At the step 512a, an empty block in the file system is secured, and specified data is written to the empty block.

At step 513a, an entry having the block copied at the step 512a in the column 411 and having a value in which only bits indicating virtual volumes to which data is to be written are "1" stored in the corresponding possession bit map column 412 is registered in the difference block management table 212.

At step 514, the value of the block address referenced at the step 511 is updated with the address of the block at which data has been written at the step 512a.

At step 508, the processing is finished.

Figure 13:
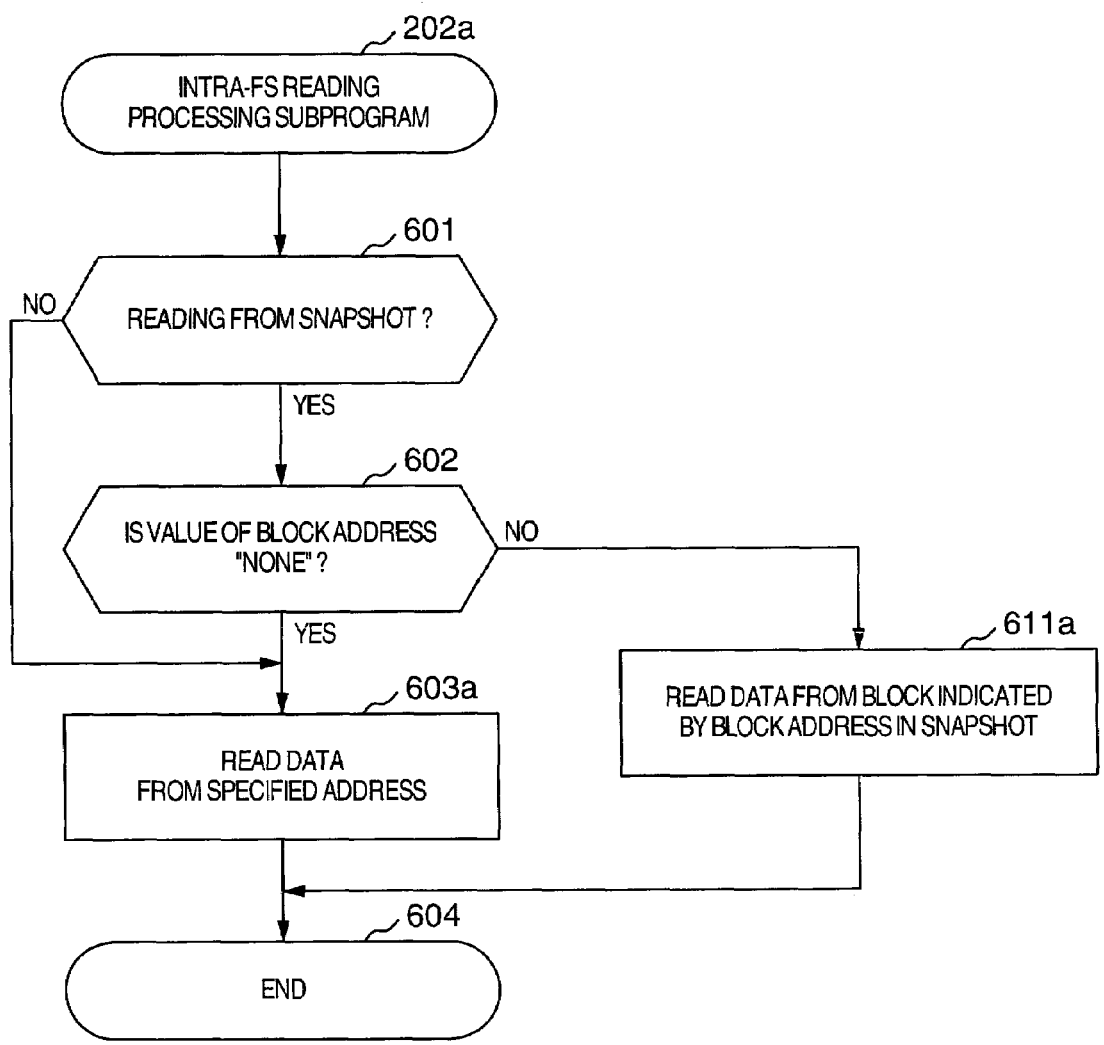
FIG. 13 is a diagram showing an example of a processing flow of an intra-file system reading processing subprogram.

FIG. 13 shows a processing flow of the intra-FS reading processing subprogram 202a in the file system processing program having the snapshot function.

At step 601, it is determined whether reading is reading from the snapshot. In the case of the file system, the processing proceeds to step 603a. In the case of the snapshot, the processing proceeds to step 602.

At the step 602, the value of the block address corresponding to a specified block address in a virtual volume to be read described in the snapshot management table 211 is referenced, and it is determined whether the value is "none". If the value is "none", then the processing proceeds to the step 603a. If the value is not "none", then the processing proceeds to step 611a.

At the step 603a, block data read out from a block that is indicated by a specified block address is returned.

At the step 611a, block data read out from the block that is indicated by the block address referenced at the step 602 is returned.

At step 604, the processing is finished.

Figure 14:
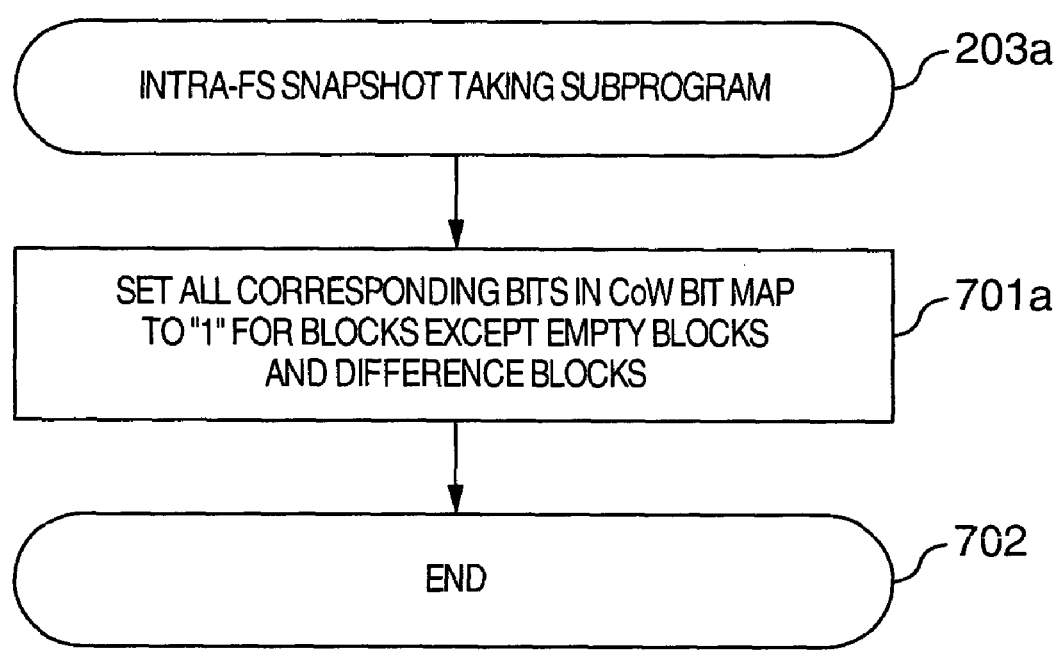
FIG. 14 is a diagram showing an example of a processing flow of an intra-file system snapshot taking subprogram.

FIG. 14 shows a processing flow of the intra-FS snapshot taking subprogram 203a in the file system processing program having snapshot function 1001.

At step 701a, bits for a virtual volume corresponding to a snapshot to be taken, in the CoW bit map column 312 are updated with "1", for all block addresses corresponding to all blocks except empty blocks and different blocks in the file system in the block address column 311 in the snapshot management table 211. In addition, all block addresses in the virtual volume corresponding to the snapshot to be taken are set to "none".

At step 702, the processing is finished.

Figure 15:
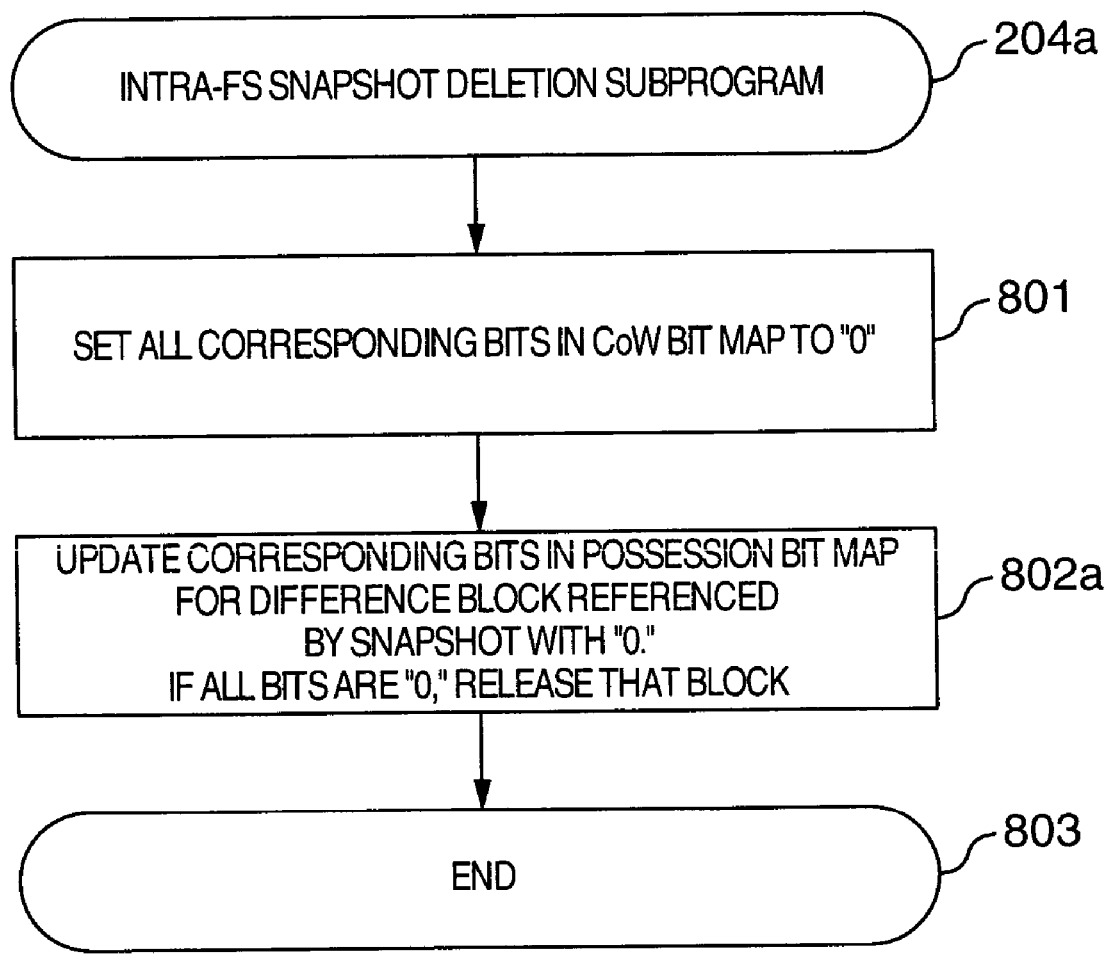
FIG. 15 is a diagram showing an example of a processing flow of an intra-file system snapshot deletion subprogram.

FIG. 15 shows a processing flow of the intra-FS snapshot deletion subprogram 204a in the file system processing program having snapshot function 1001.

At step 801, bits for a virtual volume corresponding to a snapshot to be deleted, in the CoW bit map column 312 are updated with "0", for all block addresses in the block address column 311 in the snapshot management table 211.

For all blocks described in block addresses (for example, the column 314) in the virtual volume corresponding to the snapshot to be deleted in the snapshot management table 211, bits for the virtual volume corresponding to the snapshot to be deleted, in the possession bit map column 412 in the difference block management table 212 are updated with 0 at step 802a. If all bits in a possession bit map in the column 412 have become "0", then the entry is deleted from the difference block management table 212 and the block is released as an empty block in the file system.

At step 803, the processing is finished.

In the third embodiment according to the present invention, the snapshots are maintained without moving blocks assigned when the file system created a file, when updating data of the file.

Typically, when creating a file, the file system assigns blocks continuously in order to increase the efficiency of continuous reading.

In the present method, therefore, blocks do not become discontinuous, and the efficiency of file reading is not lowered.

In the third embodiment according to the present invention, the method of securing difference blocks from empty blocks has been shown. However, it is also possible to assign a difference volume and store difference blocks in the difference volume in the same way as the first embodiment of the present invention.

In the third embodiment according to the present invention, snapshots are managed every file system. By assigning the snapshot management table 211 to each of the files, however, a snapshot for each of the files can be implemented easily.

In the first to third embodiments of the present invention, writing to a virtual volume which provides a snapshot is possible.

A volume image of a virtual volume which provides a snapshot is changed by writing.

According to the following procedure, a snapshot for a snapshot can be taken.

Assuming that a snapshot 1 is a basic snapshot and a snapshot 2 is a snapshot to be taken, a value of a CoW bit and a value of a block list 313 in the virtual volume 1 corresponding to the snapshot 1 in the snapshot management table 211 are copied to a CoW bit and a block list 314 in the virtual volume 2 corresponding to the snapshot 2. For all difference blocks included in the block list of the virtual volume 1, possession bits 412 corresponding to the snapshot to be taken are updated with "1".

As a result, it becomes possible to take a snapshot for the snapshot 1 as the snapshot 2.

In the present invention, a management table for managing the difference from the operational volume every snapshot is used and maintaining a plurality of snapshots for the operational volume is implemented by using one difference storage area.

For each of blocks in the operational volume, the management table uses at least a maximum snapshot number of CoW (Copy-on-Write) flags, a table having block addresses for each of snapshots, and a table for managing as to which snapshot references a difference. When taking a snapshot, a CoW flag on the management table is set. When updating the operational volume, CoW flags on the management table are referenced. If there is a snapshot having a CoW flag that is set and needing a copy of old data, then old data of a pertinent block is copied to the difference storage area. In addition, as a block address of every snapshot having a CoW flag that is set, an address of a copy destination block is set. As snapshots that reference the difference, all snapshots having a CoW flag that is set are set. Thereafter, the CoW flags are cleared.

As a result, not only the capacity of the difference storage area required to maintain the snapshots is restrained to the difference data and the management data, but also the snapshots can share the difference on the difference storage area. Therefore, the amount of consumption for the difference storage area can be restrained.

As for each snapshot, a virtual volume for providing a volume image of the operational volume at the time of snapshot taking is provided. As for a virtual volume, it is determined with reference to the management table whether a block to be read out is taken from the difference storage area or taken from the operational volume.

Hereafter, a fourth embodiment of the present invention will be described in detail with reference to FIGS. 16 to 21.

Figure 16:
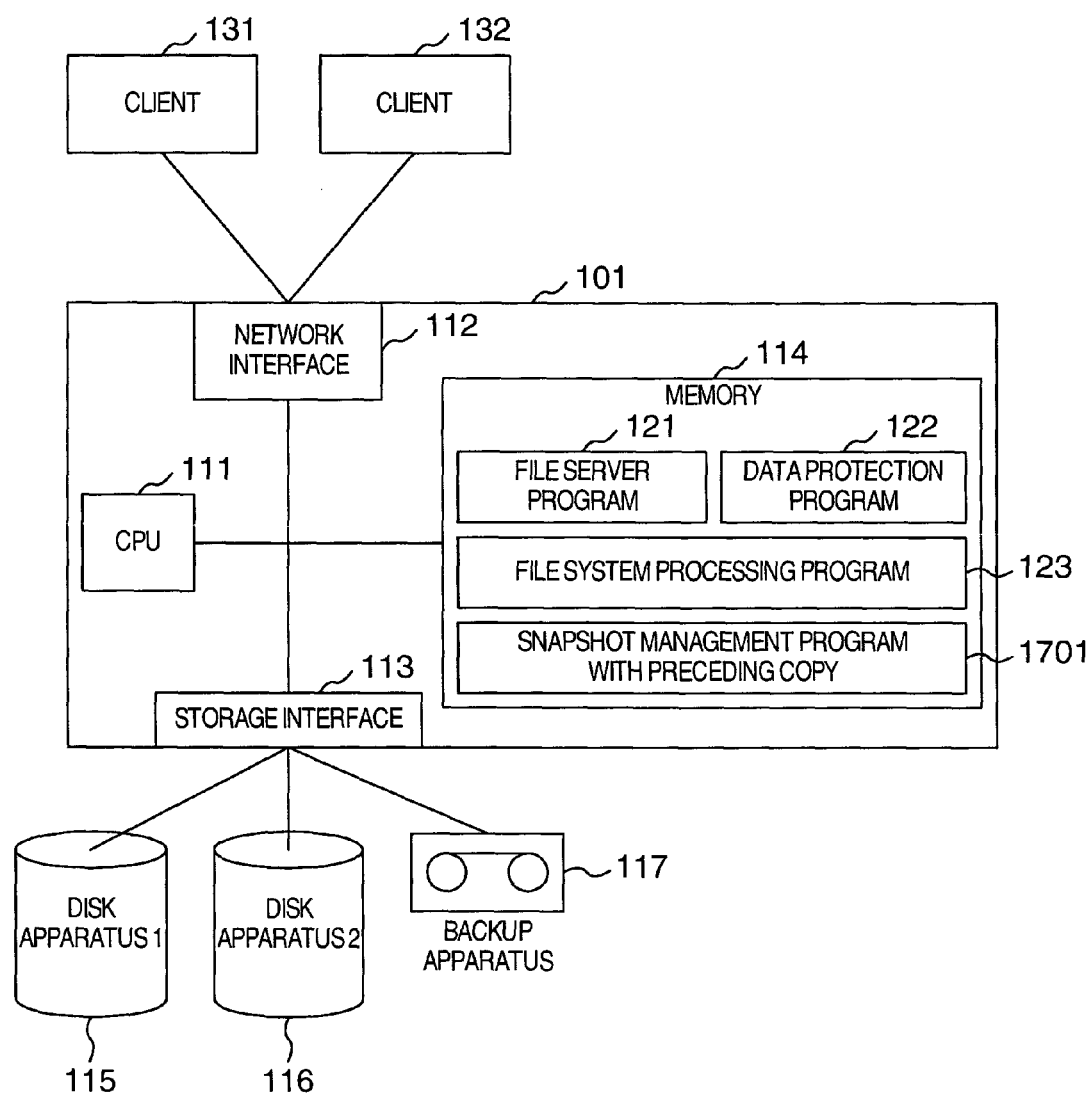
FIG. 16 is a diagram showing another example of a hardware configuration of a system according to the present invention.

FIG. 16 shows a configuration example of the fourth embodiment according to the present invention. FIG. 16 is obtained by replacing the snapshot management program 124 in the first embodiment of the present invention shown in FIG. 1 with a snapshot management program with preceding copy 1701.

Hereafter, the snapshot management program with preceding copy 1701 will be described.

Figure 17:
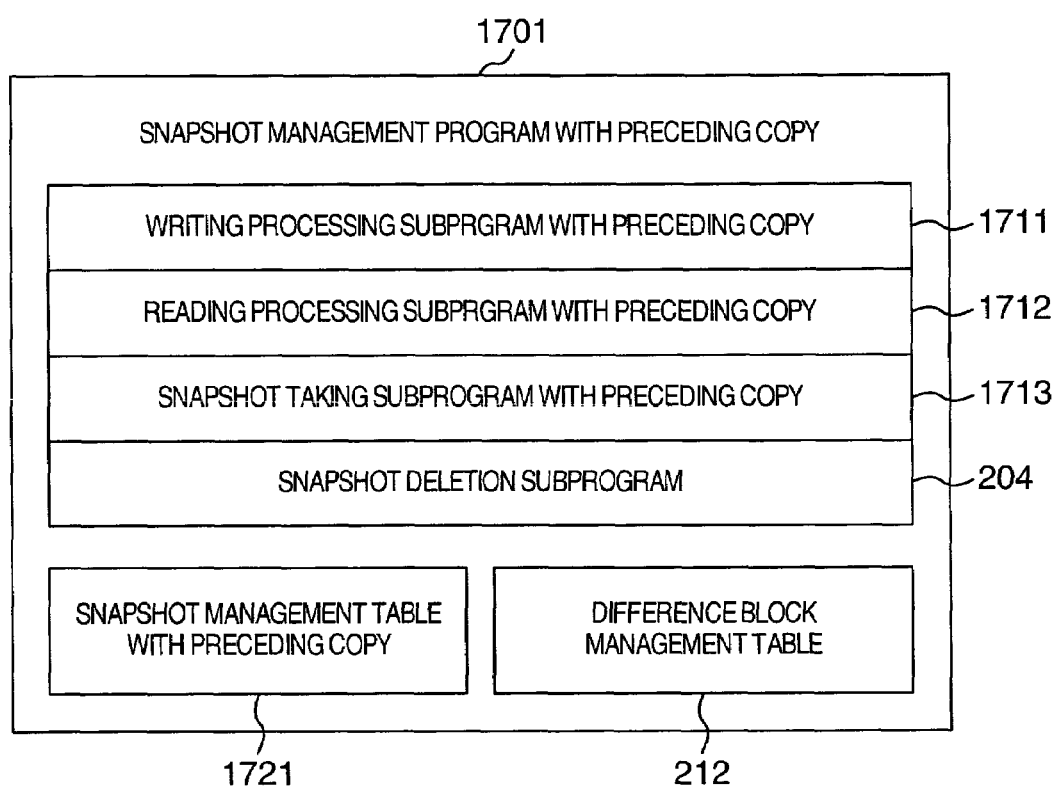
FIG. 17 is a diagram showing a configuration example of a snapshot management program with preceding copy.

FIG. 17 shows a configuration of the snapshot management program with preceding copy 1701.

The snapshot management program with preceding copy 1701 calls a writing processing subprogram with preceding copy 1711 and a reading processing subprogram with preceding copy 1712 in response to a processing request issued by the file system processing program 123, and calls a snapshot taking subprogram with preceding copy 1713 and the snapshot deletion subprogram 204 in response to a processing request issued by the data protection program 122.

A snapshot management table with preceding copy 1721 holds data in order to maintain snapshots and make the snapshots usable.

The difference block management table 212 holds data in order to manage the block use situation in the difference volume.

FIG. 18 shows details of the snapshot management table with preceding copy 1721.

Columns 311 to 315 of the snapshot management table with preceding copy 1721 are similar to those in the snapshot management table shown in FIG. 3. In a row 1801 shown in FIG. 18, the column 311 indicates a block address 0 in the operational volume, and the column 312 shows that the CoW bit map is none (not present). In the row 1801, the columns 313, 314 and 315 show that contents at the block address 0 in the virtual volumes 1, 2 and n corresponding to the snapshots 1, 2 and n are stored in the difference volume at the block addresses 100, 200 and 300, respectively. A row 1802 in FIG. 18 is also similar to the row 1801. Rows 1803 and 1804 in FIG. 18 are similar to the rows 303 and 304 in FIG. 3.

In FIG. 18, block addresses 0 to (q−1) in the operational volume, for which the CoW bit map in the column 312 is none, indicate that data was copied to the difference volume at the time of snapshot taking without referencing the CoW bit map in the column 312, before writing to the operational volume.

Hereafter, processing flows of subprograms in the snapshot management program with preceding copy 1701 will be described with reference to FIGS. 19 to 21.

Figure 19:
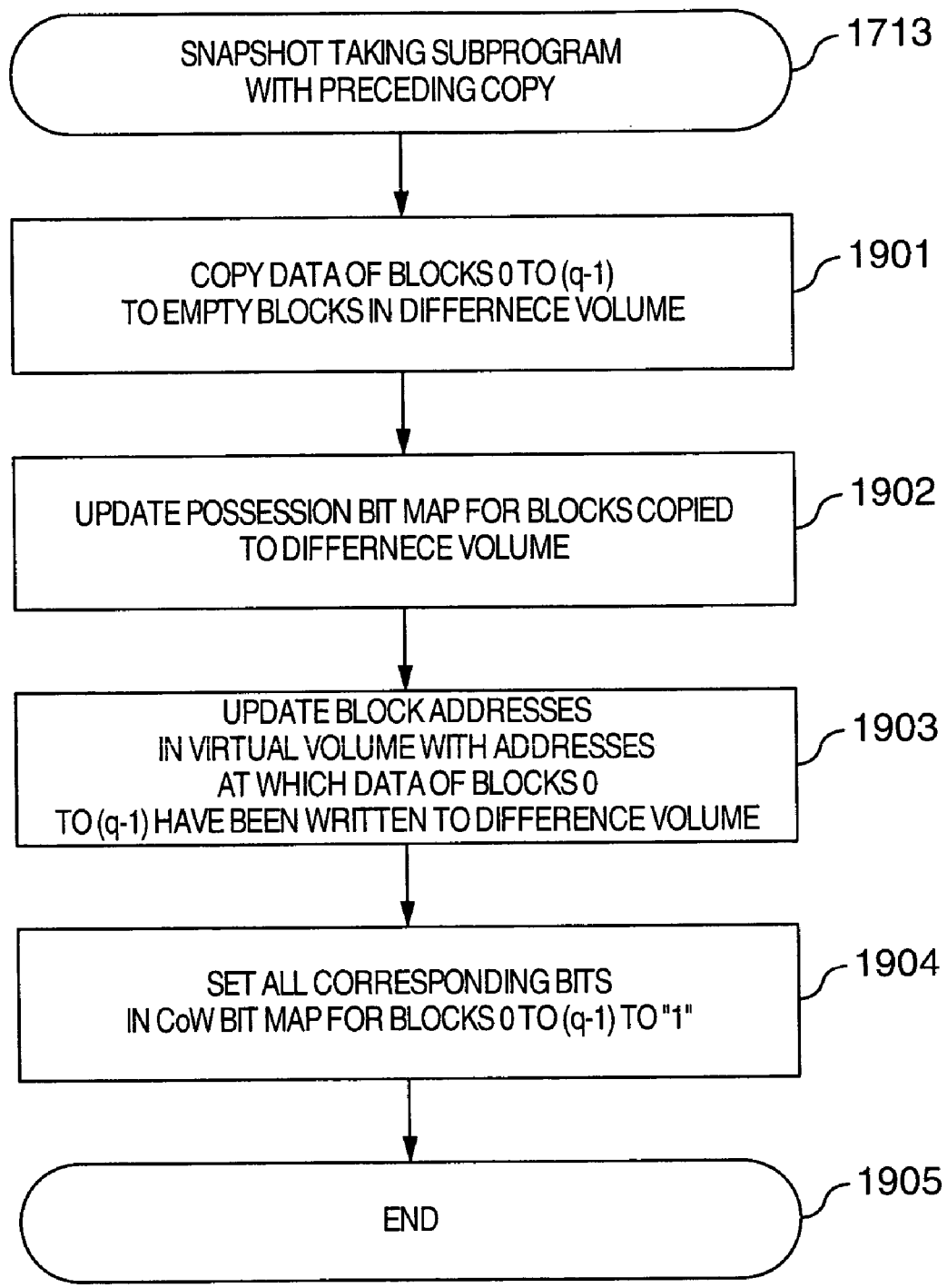
FIG. 19 is a diagram showing an example of a processing flow of a snapshot taking program with preceding copy.

FIG. 19 shows a processing flow of the snapshot generation subprogram with preceding copy 1713 in the snapshot generation subprogram with preceding copy 1701.

At step 1901, data at block addresses 0 to (q−1) in the operational volume are copied to empty blocks in the difference volume.

At step 1902, in the possession bit maps 412 in the difference block management table 212 corresponding to the block addresses 411 of the blocks in the difference volume to which data of block addresses 0 to (q−1) in the operational volume were copied at the step 1901, values of bits corresponding to a snapshot to be taken are updated with "1".

At step 1903, block addresses in the difference volume to which data of the block addresses 0 to (q−1) in the operational volume have been copied are stored respectively in block addresses in a virtual volume (for example, the column 314 in the case where the snapshot 2 is taken) corresponding to a snapshot to be taken, in the snapshot management table with preceding copy 1721.

At step 1904, bits for the virtual volume corresponding to the snapshot to be taken, in the CoW bit map column 312 are updated with "1", for q to (m−1) in the block address column 311 in the operational volume in the snapshot management table with preceding copy 1721, and the block address of the virtual volume corresponding to the snapshot to be generated is set to "none".

At step 1905, the processing is finished.

Figure 20:
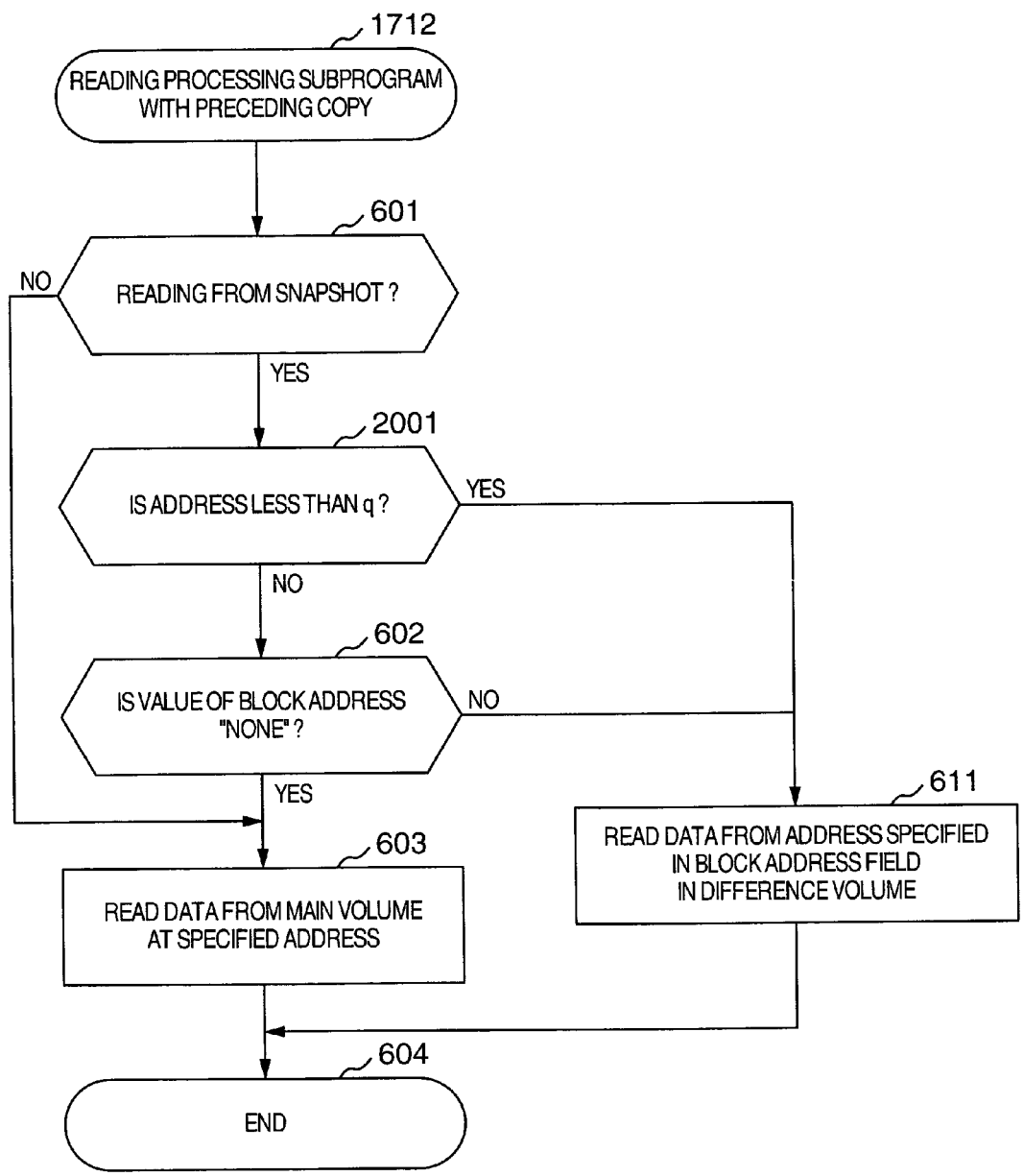
FIG. 20 is a diagram showing an example of a processing flow of a reading processing program with preceding copy.

FIG. 20 shows a processing flow of the snapshot reading subprogram with preceding copy 1712 in the snapshot generation subprogram with preceding copy 1701.

The snapshot reading subprogram with preceding copy 1712 is not different from the snapshot reading subprogram 202 shown in FIG. 6 except that step 2001 is inserted between the step 601 and the step 602.

At the step 2001, it is determined whether the specified block address in the virtual volume to be read is less than q. If the specified block address is less than q, then the processing proceeds to the step 611. If the specified block address is at least q, then the processing proceeds to the step 602.

Figure 21:
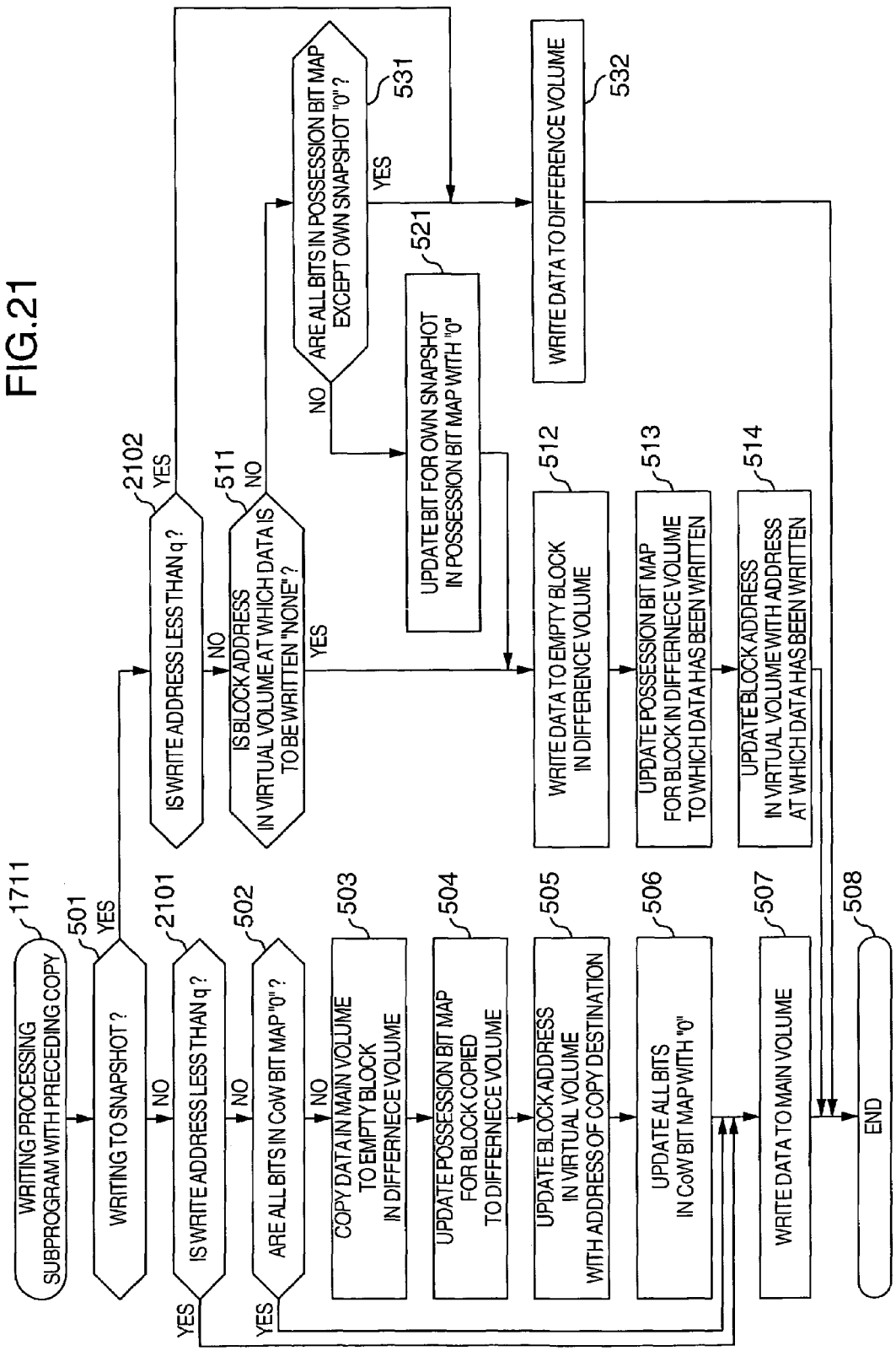
FIG. 21 is a diagram showing an example of a processing flow of a writing processing program with preceding copy.

FIG. 21 shows a processing flow of the snapshot writing subprogram with preceding copy 1711 in the snapshot generation subprogram with preceding copy 1701.

The snapshot writing subprogram with preceding copy 1711 is not different from the snapshot writing subprogram 201 shown in FIG. 5 except that step 2101 is inserted between the step 501 and the step 502 and step 2102 is inserted between the step 501 and the step 511.

At the step 2101, it is determined whether the block address at which data is to be written is less than q. If the block address is less than q, then the processing proceeds to the step 507. If the block address is at least q, then the processing proceeds to the step 502.

At the step 2102, it is determined whether the block address at which data is to be written is less than q. If the block address is less than q, then the processing proceeds to the step 532. If the block address is at least q, then the processing proceeds to the step 511.

In the fourth embodiment of the present invention, a function of previously adding blocks associated with address blocks 0 to (q−1) to the difference volume when taking a snapshot, whether writing to the operational volume is conducted, is added to the first embodiment of the present invention. In other words, if the snapshot taking subprogram with preceding copy is executed when an order of snapshot taking is issued from the data protection program, then blocks associated with block addresses 0 to (q−1) in the operational volume are copied to the difference volume after the snapshot taking order has been issued and before a request for writing to the operational volume is issued. In a system in which places where update of the operational volume is conducted frequently, such as a management table called superblock in the file system and a management information alteration history storage area in the file system called journal log, are known, previously copying the places to the block addresses 0 to (q−1) brings about an effect that occurrence of the time consuming CoW processing is prevented when updating the operational volume and performance improvement is made possible.

In the description of the fourth embodiment of the present invention, blocks associated with block addresses less than q are the subject of preceding copy. However, it can be implemented easily to make an arbitrary block the subject of preceding copy by managing the subject block of the preceding copy with a bit map, a block list or some ranges of blocks.

Figure 22:
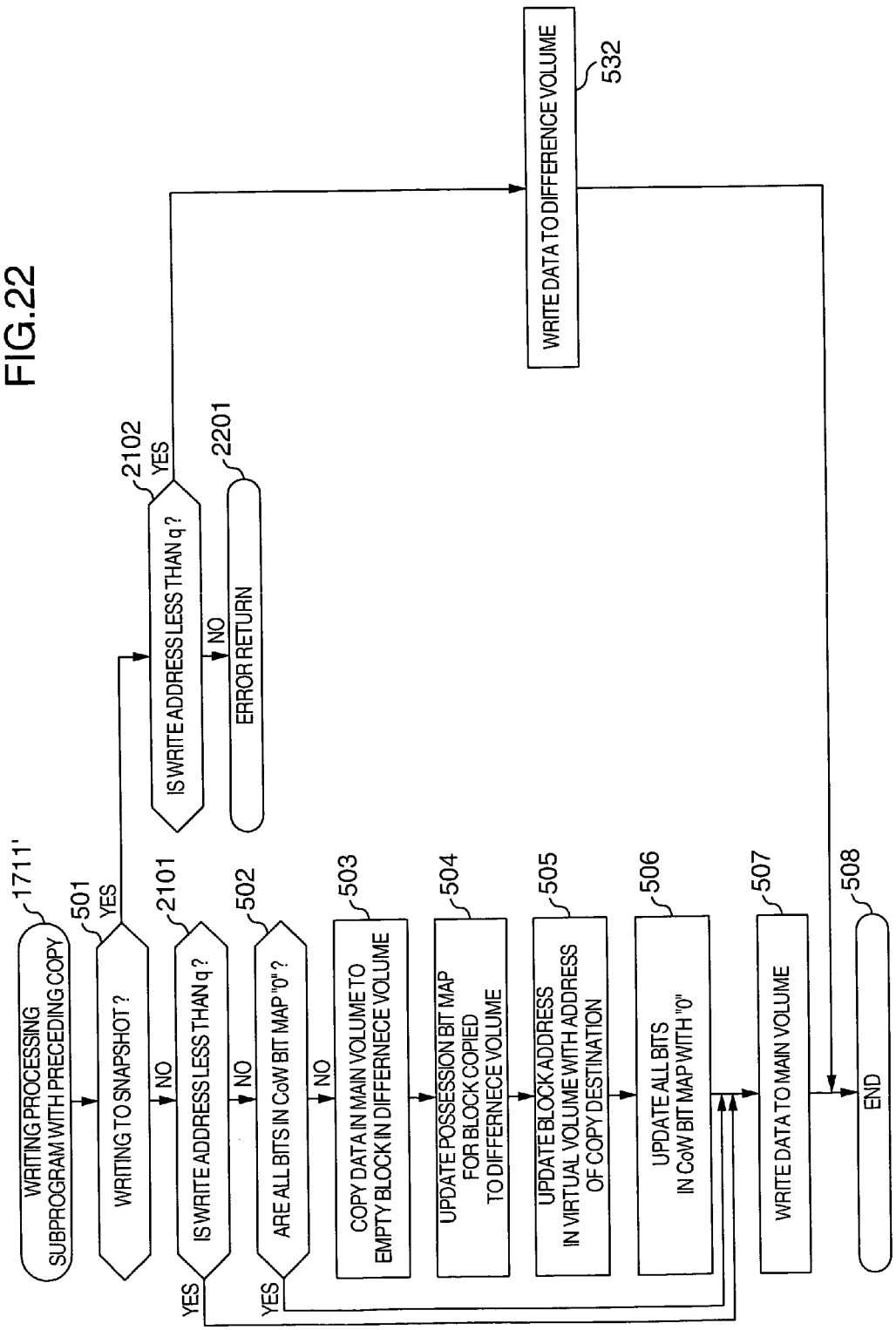
FIG. 22 is a diagram showing another example of a processing flow of a writing processing program with preceding copy.

FIG. 22 shows a processing flow of a second snapshot writing processing subprogram with preceding copy 1711', which is a different embodiment of the snapshot writing processing subprogram with preceding copy 1711 shown in FIG. 21 in the fourth embodiment of the present invention.

The second snapshot writing processing subprogram with preceding copy 1711' is not different from the snapshot writing processing subprogram with preceding copy 1711 shown in FIG. 21 except that the processing of the step 2102 and subsequent steps is altered.

If the write address is at least q at the step 2102, then the processing proceeds to step 2201 and error return is conducted.

As for the snapshots, therefore, rewriting of blocks associated with the block address q and subsequent block addresses can be prohibited.

Figure 23:
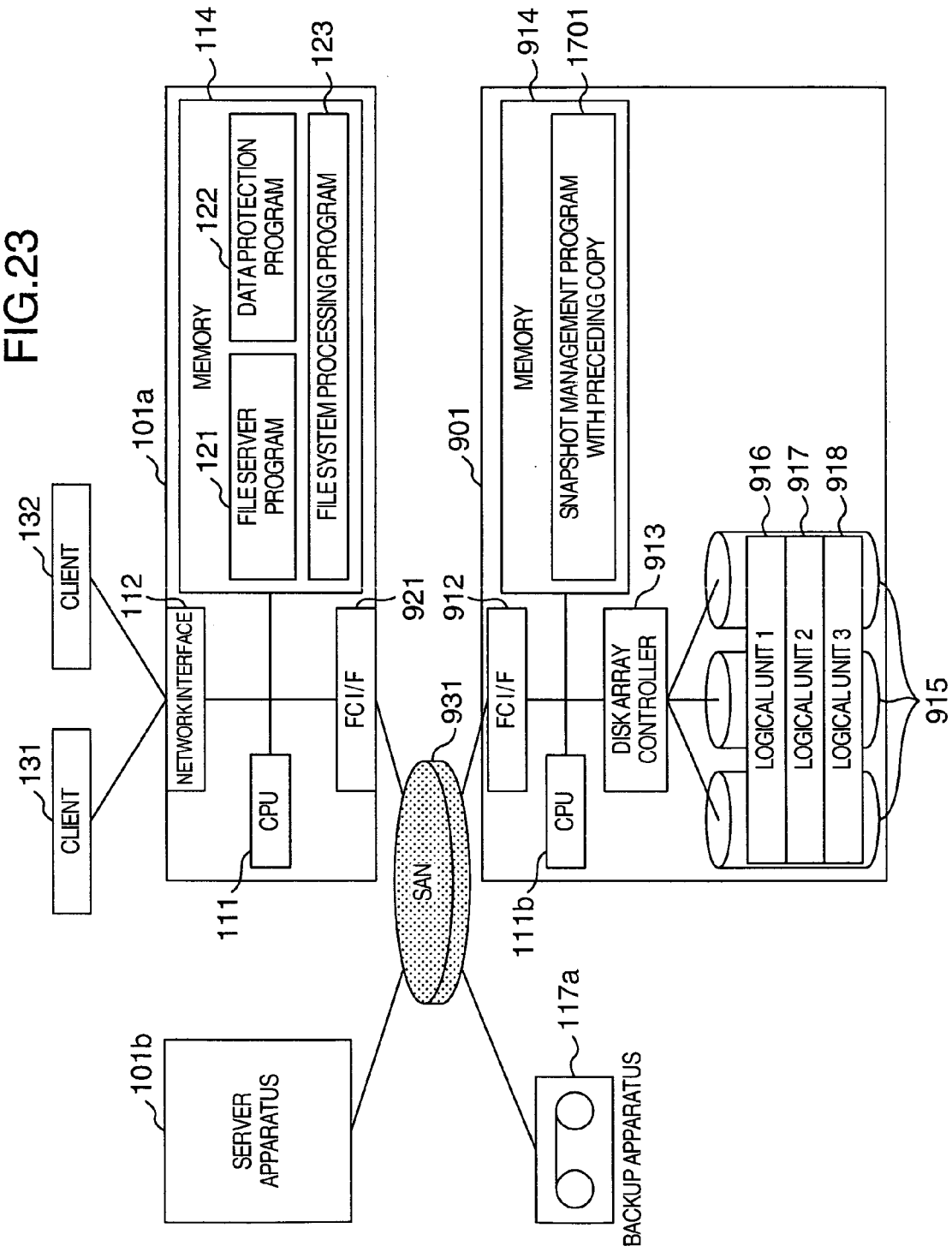
FIG. 23 is a diagram showing another example of a hardware configuration of a system according to the present invention.

FIG. 23 shows a configuration example of a fifth embodiment according to the present invention. The fifth embodiment is obtained by replacing the snapshot management program 124 in the second embodiment of the present invention shown in FIG. 9 with a snapshot management program with preceding copy 1701.

In the fifth embodiment of the present invention, effects similar to those of the fourth embodiment of the present invention are brought about, and in addition it becomes possible to facilitate volume label rewriting.

In a server apparatus 101a shown in FIG. 23, each logical volume is provided with a unique identifier in order to prevent a file system stored in a logical volume from being made unidentifiable by adding or removing a logical volume. If a virtual volume that provides a snapshot of a logical volume assigned to the logical unit 916 by the server apparatus 101a is provided for the server apparatus 101a as a virtual logical unit 918 by the storage apparatus 901, then the server apparatus 101a recognizes the logical unit 916 and the logical unit 918 with the very same identifier. The server apparatus 101a cannot handle logical units having the very same identifier according to the server apparatus. In such a case, therefore, identifier alteration called volume level rewriting is conducted. On the other hand, since snapshot is a function of maintaining a past volume image, it is more convenient in some cases that rewriting is impossible. In the fifth embodiment, therefore, an area in which a volume label is stored is handled as a preceding copy subject area. When taking a snapshot, data stored in the preceding copy subject area are copied to the difference volume before a write request for the area is actually issued, whether a write request is issued. In addition, the second snapshot writing processing subprogram with preceding copy 1711' is used. If the subject of the write request is a snapshot and is a preceding copy subject area, then data is written to the difference volume. If the subject of the write request is a snapshot and is an area other than a preceding copy subject area, then an error is returned. Owing to such processing, it becomes possible to rewrite the volume label while protecting the data part other than the volume label of the snapshot.

When rewriting a volume label of a snapshot volume in rewriting processing of the volume label, it is typically necessary to copy data of a block that stores the volume label from the operational volume to the difference volume and thereafter write a new volume label to the difference volume. If the snapshot management program with preceding copy 1701 is used, however, then the volume label has already been copied from the operational volume to the difference volume by the preceding copy when taking a snapshot. Therefore, it is necessary only to write a new volume label to the difference volume, and it becomes possible to execute the volume label rewriting processing at high speed.

According to the above-described embodiments, it becomes possible to maintain and provide a plurality of snapshots by preparing one difference volume for an operational volume which becomes the subject of snapshot.

It becomes possible to maintain and provide a plurality of snapshots by using only the operational volume.

Even if a snapshot is taken, the block arrangement in the operational volume or file system is not altered. Therefore, the efficiency of consecutive access can be maintained.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method for maintaining a plurality of snapshots of an operational volume in a server apparatus; said operational volume having a plurality of blocks each for allowing a block of data to be read/written therein; respective ones of said plurality of snapshots representing volume images of said operational volume taken at different points-in-time, the server apparatus including at least one CPU, a memory, at least one network interface and at least one storage interface, at least one disk apparatus being connected to said storage interface, the method comprising:

providing a plurality of virtual volumes in association with respective ones of said snapshots representing volume images of said operational volume taken at different points-in-time, for allowing at least one user to read/write a desired snapshot of said plurality of snapshots from/to a block in said plurality of virtual volumes;

forming a difference volume for storing therein a copy of a block of data stored in a block of said operational volume; and generating a first table accessible from said plurality of virtual volumes, said first table storing, in association with each of said virtual volumes, information indicating if a copy of a block of data in a block of said operational volume is present in said difference volume or not; said information including an address value of the block storing therein said desired snapshot of said plurality of snapshots in said difference volume, or information indicating that said block of data is in said block of said operational volume and not present in said difference volume, wherein every one of said plurality of virtual volumes that are associated with respective ones of said snapshots is associated with said difference volume, and difference data in snapshots for said operational volume are stored in said same difference volume;

wherein said copy is read from said difference volume as said desired snapshot of said plurality of snapshots if said copy is present in said difference volume, and said copy is read from said operational volume if no copy is present in said differential volume.

2. The method for maintaining a plurality of snapshots according to claim 1, further comprising:

generating a second table, the second table having a value indicating whether snapshots are stored respectively in the virtual volumes, in association with each of blocks in the difference volume in which difference data in snapshots are stored.

3. The method for maintaining a plurality of snapshots according to claim 2, comprising:

referencing the first table when writing a snapshot to one of the virtual volumes, making a first decision whether an address value of a block that stores the snapshot is stored in a virtual volume to which the snapshot is to be written, and in response to an affirmative result in the first decision, making a second decision whether an address value of a block that stores a snapshot is stored also in another virtual volume.

4. The method for maintaining a plurality of snapshots according to claim 3, comprising:

writing a block of data to a new block in the difference volume, if it is found that an address value of a block that stores a snapshot is stored also in another virtual volume as a result of the second decision;

altering, in the first table, the address value of the block stored in the virtual volume to which the data is to be written, to the same address value as an address value of the new block; and altering, in the second table, the value indicating whether snapshots are stored respectively in the virtual volumes, associated with the address value of the new block.

5. A method for maintaining a plurality of snapshots of an operational volume in a storage apparatus; said operational volume having a plurality of blocks each for allowing a block of data to be read/written therein; respective ones of said plurality of snapshots representing volume images of said operational volume taken at different points-in-time, the storage apparatus including at least one CPU, at least one interface, at least one physical disk apparatus, at least two logical units, a disk array controller and a memory, the storage apparatus being connected to at least one server apparatus via the interface, the method comprising:

providing a plurality of virtual volumes in association with respective ones of said snapshots representing volume images of said operational volume taken at different points-in-time, for allowing at least one user to read/write a desired snapshot of said plurality of snapshots from/to a block in said plurality of virtual volumes;

forming a difference volume for storing therein a copy of a block of data stored in a block of said operational volume; and generating a first table accessible from said plurality of virtual volumes, said first table storing, in association with each of said virtual volumes, information indicating if a copy of a block of data in a block of said operational volume is present in said difference volume or not; said information including an address value of the block storing therein said desired snapshot of said plurality of snapshots in said difference volume, or information indicating that said block of data is in said block of said operational volume and not present in said difference volume, wherein every one of said plurality of virtual volumes that are associated with respective ones of said snapshots is associated with said difference volume, and difference data in snapshots for said operational volume are stored in said same difference volume;

wherein said desired copy is read from said difference volume as said desired snapshot of said plurality of snapshots if said copy is present in said difference volume, and said copy is read from said operational volume if no copy is present in said differential volume.

6. The method for maintaining a plurality of snapshots according to claim 5, further comprising:

generating a second table, the second table having a value indicating whether snapshots are stored respectively in the virtual volumes, in association with each of blocks in the difference volume in which difference data in snapshots are stored.

7. The method for maintaining a plurality of snapshots according to claim 6, comprising:

referencing the first table when writing a snapshot to one of the virtual volumes, making a first decision whether an address value of a block that stores the snapshot is stored in a virtual volume to which the snapshot is to be written, and in response to an affirmative result in the first decision, making a second decision whether an address value of a block that stores a snapshot is stored also in another virtual volume.

8. The method for maintaining a plurality of snapshots according to claim 7, comprising:

writing a block of data to a new block in the difference volume, if it is found that an address value of a block that stores a snapshot is stored also in another virtual volume as a result of the second decision;

altering, in the first table, the address value of the block stored in the virtual volume to which the data is to be written, to the same address value as an address value of the new block; and altering, in the second table, the value indicating whether snapshots are stored respectively in the virtual volumes, associated with the address value of the new block.

9. A server apparatus including at least one CPU, a memory, at least one network interface, and at least one storage interface, at least one disk apparatus being connected to the storage interface, the server apparatus comprising:

means for providing a plurality of virtual volumes in association with respective ones of said snapshots representing volume images of an operational volume taken at different points-in-time, for allowing at least one user to read/write a desired snapshot of said plurality of snapshots from/to a block in said plurality of virtual volumes;

means for forming a difference volume for storing therein a copy of a block of data stored in a block of said operational volume; and snapshot means for generating a first table accessible from said plurality of virtual volumes, said first table storing, in association with each of said virtual volumes, information indicating if a copy of a block of data in a block of said operational volume is present in said difference volume or not; said information including an address value of the block storing therein said desired snapshot of said plurality of snapshots in said difference volume, or information indicating that said block of data is in said block of said operational volume and not present in said difference volume, wherein every one of said plurality of virtual volumes that are associated with respective ones of said snapshots is associated with said difference volume, and difference data in snapshots for said operational volume are stored in said same difference volume;

wherein said copy is read from said difference volume as said desired snapshot of said plurality of snapshots if said copy is present in said difference volume, and said copy is read from said operational volume if no copy is present in said differential volume.

10. The server apparatus according to claim 9, further comprising:

a second table having a value indicating whether snapshots are stored respectively in the virtual volumes, in association with each of blocks in the difference volume in which difference data in snapshots are stored.

11. The server apparatus according to claim 10, wherein said snapshot means is configured to:

reference the first table when writing a snapshot to one of the virtual volumes, make a first decision whether an address value of a block that stores the snapshot is stored in a virtual volume to which the snapshot is to be written, and in response to an affirmative result in the first decision, make a second decision whether an address value of a block that stores a snapshot is stored also in another virtual volume.

12. The server apparatus according to claim 11, wherein if it is found that an address value of a block that stores a snapshot is stored also in another virtual volume as a result of the second decision, then the snapshot means writes a block of data to a new block in the difference volume, the snapshot means alters, in the first table, the address value of the block stored in the virtual volume to which the data is to be written, to the same address value as an address value of the new block, and the snapshot means alters, in the second table, the value indicating whether snapshots are stored respectively in the virtual volumes, associated with the address value of the new block.

13. A storage apparatus including at least one CPU, at least one interface, at least one physical disk apparatus, at least two logical units, a disk array controller and a memory, the storage apparatus being connected to at least one server apparatus via the interface, the storage apparatus comprising:

means for providing a plurality of virtual volumes in association with respective ones of said snapshots representing volume images of an operational volume taken at different points-in-time, for allowing at least one user to read/write a desired snapshot of said plurality of snapshots from/to a block in said plurality of virtual volumes;

means for forming a difference volume for storing therein a copy of a block of data stored in a block of said operational volume; and snapshot means for generating a first table accessible from said plurality of virtual volumes, said first table storing, in association with each of said virtual volumes, information indicating if a copy of a block of data in a block of said operational volume is present in said difference volume or not; said information including an address value of the block storing therein said desired snapshot of said plurality of snapshots in said difference volume, or information indicating that said block of data is in said block of said operational volume and not present in said difference volume, wherein every one of said plurality of virtual volumes that are associated with respective ones of said snapshots is associated with said difference volume, and difference data in snapshots for said operational volume are stored in said same difference volume;

wherein said copy is read from said difference volume as said desired snapshot of said plurality of snapshots if said copy is present in said difference volume, and said copy is read from said operational volume if no copy is present in said differential volume.

14. The storage apparatus according to claim 13, further comprising:

a second table having a value indicating whether snapshots are stored respectively in the virtual volumes, in association with each of blocks in the difference volume in which difference data in snapshots are stored.

15. The storage apparatus according to claim 14, wherein said snapshot means is configured to:

reference the first table when writing a snapshot to one of the virtual volumes, make a first decision whether an address value of a block that stores the snapshot is stored in a virtual volume to which the snapshot is to be written, and in response to an affirmative result in the first decision, make a second decision whether an address value of a block that stores a snapshot is stored also in another virtual volume.

16. The storage apparatus according to claim 15, wherein if it is found that an address value of a block that stores a snapshot is stored also in another virtual volume as a result of the second decision, then the snapshot means writes a block of data to a new block in the difference volume, the snapshot means alters, in the first table, the address value of the block stored in the virtual volume to which the data is to be written, to the same address value as an address value of the new block, and the snapshot means alters, in the second table, the value indicating whether snapshots are stored respectively in the virtual volumes, associated with the address value of the new block.

17. A computer-readable medium including a snapshot management program for making a computer execute, the snapshot management program comprising:

code for providing a plurality of virtual volumes in association with respective ones of a plurality of snapshots representing volume images of an operational volume taken at different points-in-time;

code for referencing a first table when writing a snapshot of said plurality of snapshots to one of the virtual volumes, the first table storing, in association with each of blocks in the operational volume, an address value of a block storing a snapshot of said plurality of snapshots in each of the virtual volumes or information indicating that any snapshot is not stored, and a value indicating whether snapshots are stored respectively in the virtual volumes, of making a first decision whether an address value of a block that stores the snapshot is stored in a virtual volume to which the snapshot is to be written, corresponding to a block in the operational volume to be updated, and of responding to an affirmative result in the first decision by making a second decision whether an address value of a block that stores a snapshot is stored also in another virtual volume corresponding to the same block in the operational volume;

code for writing difference data of the snapshot to a new block in a difference volume, if it is found that an address value of a block that stores a snapshot is stored also in another virtual volume as a result of the second decision;

code for altering, in the first table, the address value of the block stored in the virtual volume to which the snapshot is to be written, to the same address value as an address value of the new block; and code for altering, in a second table having a value indicating whether snapshots are stored respectively in the virtual volumes in association with each of blocks in the difference volume in which difference data in snapshots are stored, the value indicating whether snapshots are stored respectively in the virtual volumes, associated with a block address having the same address value as a block address value stored in the virtual volume to which the snapshot is to be written;

wherein every one of said plurality of virtual volumes that are associated with respective ones of said snapshots is associated with said difference volume, and difference data in snapshots for said operational volume are stored in said same difference volume.

18. The method according to claim 1, said information indicating if a copy of a block of data in a block of said operational volume is present in said difference volume or not includes a value indicating whether requests of copying a block in said operational volume before overwriting the block are stored respectively in said virtual volumes.

19. A method according to claim 18 further comprising:

when writing data in said operational volume, referencing said first table to determine, for each of said virtual volumes, if there are requests for copying-before-overwriting the data;

if there are the requests, copying the data stored in said blocks into empty blocks in the difference volume;

storing block addresses of the copied blocks into block addresses of all virtual volumes to which said requests of copying-before-overwriting were made; and clearing said requests for copying-before-overwriting made to all virtual volumes.

* * * * *